US007610236B2

(12) United States Patent
Sandholm et al.

(10) Patent No.: US 7,610,236 B2
(45) Date of Patent: Oct. 27, 2009

(54) METHOD AND APPARATUS FOR FORMING EXPRESSIVE COMBINATORIAL AUCTIONS AND EXCHANGES

(75) Inventors: Tuomas Sandholm, Pittsburgh, PA (US); Subhash Suri, Santa Barbara, CA (US); David L. Levine, Chesterfield, MO (US); Andrew G. Gilpin, Pittsburgh, PA (US); John Heitmann, Pittsburgh, PA (US); Robert Lawrence Shields, Jr., Huntington, WV (US)

(73) Assignee: CombineNet, Inc., Pittsburgh, PA (US)

( * ) Notice: Subject to any disclaimer, the term of this patent is extended or adjusted under 35 U.S.C. 154(b) by 1195 days.

(21) Appl. No.: 10/254,241

(22) Filed: Sep. 25, 2002

(65) Prior Publication Data

US 2003/0195835 A1 Oct. 16, 2003

Related U.S. Application Data

(60) Provisional application No. 60/371,451, filed on Apr. 10, 2002.

(51) Int. Cl.
*G06Q 40/00* (2006.01)
(52) U.S. Cl. .............................. 705/37; 705/38; 705/36; 705/35
(58) Field of Classification Search .................. 705/26, 705/35–38, 34
See application file for complete search history.

(56) References Cited

U.S. PATENT DOCUMENTS

| 5,905,975 | A | | 5/1999 | Ausubel |
| 6,021,398 | A | | 2/2000 | Ausubel |
| 6,026,383 | A | | 2/2000 | Ausubel |
| 6,035,287 | A | * | 3/2000 | Stallaert et al. ................ 705/37 |
| 6,272,473 | B1 | * | 8/2001 | Sandholm ..................... 705/37 |
| 6,415,270 | B1 | * | 7/2002 | Rackson et al. ........... 705/36 R |
| 6,704,716 | B1 | | 3/2004 | Force |
| 6,718,312 | B1 | * | 4/2004 | McAfee et al. ................ 705/37 |
| 7,043,446 | B1 | * | 5/2006 | Dietrich et al. ............... 705/26 |
| 7,058,602 | B1 | * | 6/2006 | La Mura et al. ............... 705/37 |

(Continued)

FOREIGN PATENT DOCUMENTS

JP 2001-290968 A 10/2001

(Continued)

OTHER PUBLICATIONS

Tuomas W. Sandholm, "eMediator: A Next Generation Electronic Commerce Server," Jan. 1999, Washington University, St. Louis, Department of Science Technical Report, WU-CS-99-02.*

(Continued)

*Primary Examiner*—Frantzy Poinvil
*Assistant Examiner*—Clement Graham
(74) *Attorney, Agent, or Firm*—The Webb Law Firm

(57) ABSTRACT

A method of processing an exchange includes providing a solver/analyzer for determining a solution that includes at least one of a winning allocation and feasible allocations. At least one bid is received at the solver/analyzer, with each bid including at least one item and an associated price. Exchange description data (EDD) is associated with the at least one bid. The EDD is also received at the solver/analyzer. The processing of the at least one bid is modified in accordance with the at least one feature included in the EDD.

54 Claims, 18 Drawing Sheets

U.S. PATENT DOCUMENTS

| | | | |
|---|---|---|---|
| 7,133,841 B1 * | 11/2006 | Wurman et al. | 705/37 |
| 2001/0042041 A1 * | 11/2001 | Moshal et al. | 705/37 |
| 2002/0046037 A1 | 4/2002 | Ausubel et al. | |
| 2002/0052828 A1 | 5/2002 | Ausubel | |
| 2003/0004850 A1 | 1/2003 | Li et al. | |

FOREIGN PATENT DOCUMENTS

| | | |
|---|---|---|
| JP | 2001-344457 A | 12/2001 |
| JP | 2002-099777 A | 4/2002 |
| WO | WO 01/031537 A2 | 5/2001 |
| WO | WO 01/33400 A2 | 5/2001 |
| WO | WO 01/033401 A2 | 5/2001 |

OTHER PUBLICATIONS

Tuomas W. Sandholm and Subhash Suri, "Improved Algorithms for Optimal Winner Determination in Combinatorial Auctions and Generalizations," 2000, Proceedings of the National Conference on Artificial Intelligence.*

Tuomas Sanholm, "An Algorithm for Optimal Winner Determination in Combinatorial Auctions," Jan. 28 1999, Washington University, WU-CS-99-01.*

Commerce Quest Announces the EnableNet Private Exchange Server PR Newswire New York: Apr. 10, 2002 p. 1.*

Holger Hoos and Craig Boutilier, "Solving Combinatorial Auctions using Stochastic Local Search", Proceedings of the National Conference on Artificial Intelligence (AAAI), pp. 8, Aug. 2000.

Noarn Nissan, "Bidding And Allocation In Combinatorial Auctions", Proceedings of the ACM Conference on Electronic Commerce (ACM-EC), pp. 25, (2000).

Tuomas W. Sandholm, "eMediator: A Next Generation Electronic Commerce Server", Washington University, St. Louis, Department of Computer Science Technical Report, WU-CS-99-02, pp. 341-348, Jan. 1999.

Moshe Tennenholtz, "Some Tractable Combinatorial Auctions", Proceedings of the National Conference on Artificial Intelligence (AAAI), pp. 6, Aug. 2000.

Tuomas W. Sandholm and Subhash Suri, "Improved Algorithms For Optimal Winner Determination In Combinatorial Auctions And Generalizations", Proceedings of the National Conference on Artificial Intelligence (AAAI), pp. 8, (2000).

Katia Sycara, "Utility Theory In Conflict Resolution", Annals of Operations Research 12(1988) 65-84.

David C. Parkes; "/Bundle: An Efficient Ascending Price Bundle Auction"; In Proc. ACM Conference On Electronic Commerce (EC-99), Denver, Nov. 1999; 10 pages.

David C. Parkes and Lyle H. Ungar; "An Ascending-Price Generalized Vickrey Auction"; Stanford Institute For Theoretical Economics (SITE) 2002 Summer Workshop: The Economics Of The Internet, Jun. 25-Jun. 29, 2002; pp. 1-56.

David C. Parkes and Lyle H. Ungar; "Iterative Combinatorial Auctions: Theory and Practice"; In Proc. 7th National Conference on Artificial Intelligence (AAAI-00), 8 pp.

David C. Parkes and Lyle H. Ungar; "Preventing Strategic Manipulation in Iterative Auctions: Proxy Agents And Price-Adjustment"; in Proc. 17$^{th}$ National Conference on Artificial Intelligence (AAAI-0); 2000; 8 pages.

Charles R. Plott; "Laboratory Experimental Testbeds: Application To The PCS Auction"; Massachusetts Institute of Technology; Journal of Economics & Management Strategy, vol. 6, No. 3, Fall 1997, pp. 605-638.

Lawrence M. Ausubel and Paul R. Milgrom; "Ascending Auctions With Package Bidding"; Frontiers Of Theoretical Economics'; vol. 1; Issue 1; Article 1; 2002; 44 pages.

Andrew J. Davenport and Jayant R. Kalagnanam; "Price Negotiations For Procurement Of Direct Inputs"; IBM Technical Report RC 22078; May 31, 2001; 21 pages.

Christine Demartini, Anthony M. Kwasnica, John O. Ledyard and David Porter; "A New And Improved Design For Multi-Object Iterative Auctions"; Mar. 15, 1999; 45 pages.

Marta Eso, Soumyadip Ghosh, Jayant R. Kalagnanam and Laszlo Ladanyi; "Bid Evaluation In Procurement Auctions With Piece-Wise Linear Supply Curves"; IBM Research Report RC22219 (WO110-087); Oct. 31, 2001; 36 pages.

Frank Kelly and Richard Steinberg; "A Combinatorial Auction With Multiple Winners For Universal Service"; Management Science; vol. 46, No. 4; Apr. 2000, pp. 586-596.

John O. Ledyard, David Porter and Antonio Rangel; Experiments Testing MutliObject Allocation Mechanisms; Massachusetts Institute of Technology; Journal of Economics & Management Strategy; vol. 6, No. 3; Fall 1997; pp. 639-675.

Tuomas Sandholm, Subhash Suri, Andrew Gilpin and David Levine; "Winner Determination in Combinatorial Auction Generalizations"; AAMAS'02, Jul. 15-19, 2002; 8 pages.

Lawrence M. Ausubel; "An Efficient Ascending-Bid Auction For Multiple Objects"; University of Maryland, Department of Economics; Aug. 7, 2002; 26 pages.

Sushil Bikhchandani and Joseph M. Ostroy; "Ascending Price Vickrey Auctions"; University of California, Los Angeles; Anderson School Of Management and Dept. Of Economics; Aug. 29, 2002; 34 pages.

Frank Gul and Ennio Stacchetti; The English Auction With Differentiated Commodities; Jul. 22, 1999; 25 pages.

Gabrielle Demange, David Gale and Marilda Sotomayor; "Multi-Item Auctions"; Journal of Economy; vol. 94, No. 4; 1986; pp. 863-872.

Peter R. Wurman and Michael P. Wellman; "AkBA: A Progressive, Anonymous-Price Combinatorial Auction"; EC' 00, Oct. 17-20, 2000, 9 pages.

Michael Rothkopf, Alexander Pekeč and Ronald Harstad, "Computationally Manageable Combinatorial Auctions", Rutcor Research Report, pp. 21, Apr. 1995.

Yuzo Fujishima, Kevin Leyton-Brown and Yoav Shoham, "Taming the Computational Complexity of Combinatorial Auctions: Optimal And Approximate Approaches", Proceedings of the Sixteenth International Joint Conference on Artificial Intelligence (IJCAI), pp. 6, (1999).

Tuomas Sandholm, "An Algorithm For Optimal Winner Determination in Combinatorial Auctions", Proceedings of the Sixteenth International Joint Conference on Artificial Intelligence (IJCAI), pp. 6, (1999).

Jayant R. Kalagnanam et al.: "Computational aspects of clearing continuous call double auctions with assignment constraints and indivisible demand", IBM Research Report RC21660 (97613), Feb. 2, 2000, pp. 1-15.

Andrew J. Davenport et al.: "Price negotiations for procurement of direct inputs", IBM Technical Report RC22078, May 31, 2001, pp. 1-21.

Jayant Kalagnanam et al.: "Minimizing Procurement Costs for Strategic Sourcing", IBM White Paper, 2001, IBM T.J. Watson Research Center.

Marta Eso et al.: "Bid Evaluation in Procurement Auctions with Piece-Wise Linear Supply Curves", IBM Research Report RC22219 (W0110-087), Oct. 31, 2001, pp. 1-35.

Joni Lynne Jones: "Incompletely Specified Combinatorial Auction: An Alternative Allocation Mechanism For Business-To-Business Negotiations", Doctoral Thesis Presented to the Graduate School of the University of Florida, 2000, UMI No. 9984436, Bell & Howell Information and Learning Company, Ann Arbor, Michigan.

Joni L. Jones et al.: "Incompletely Specified Combinatorial Auctions", Oct. 25, 2000, pp. 1-32.

Christopher George Caplice: "An Optimization Based Bidding Process: A New Framework for Shipper-Carrier Relationships", Doctoral Thesis, MIT Jun. 1996.

* cited by examiner

FIG. 4

| ALLOCATION CONSTRAINED | |
|---|---|
| BID 5 | VALUE = $1000.00 |
| BID 10 | |
| BID 15 | |

240

| ALLOCATION RELAXED RELAXATION COST = 1000 | |
|---|---|
| BID 5 | VALUE = $4000.00 |
| BID 10 | |
| BID 15 | |
| BID 20 | |
| BID 25 | |

242

| ALLOCATION UNCONSTRAINED | |
|---|---|
| BID 5 | VALUE = $5000.00 |
| BID 15 | |
| BID 30 | |
| BID 35 | |
| BID 45 | |
| BID 55 | |

METHOD AND APPARATUS FOR FORMING EXPRESSIVE COMBINATORIAL AUCTIONS AND EXCHANGES

CROSS REFERENCE TO RELATED APPLICATION

The present invention claims priority from U.S. Provisional Patent Application Ser. No. 60/371,451, filed Apr. 10, 2002, entitled "Side Constraints And Non-Price Attributes In Combinatorial Markets".

BACKGROUND OF THE INVENTION

1. Field of the Invention

The present invention relates to combinatorial exchanges, and more specifically, to associating one or more processing features with one or more bids or one or more bid groups, wherein each processing feature modifies the processing of the one or more bids or the one or more bid groups.

2. Description of the Prior Art

Various systems have been proposed and constructed to support online exchanges, forward auctions and reverse auctions. The most general of these market types is an exchange, which permits one or more bidders to offer to sell and/or purchase one or more items. An item may be any entity of value, such as a good or service. A forward auction is a special case of an exchange with a single seller. A reverse auction is a special case of an exchange with single buyer.

Combinatorial exchanges support advanced exchange designs and expressive bidding. These features permit an exchange to be designed to achieve best economic efficiency.

One example of expressive bidding is combinatorial bids. Combinatorial bids allow bidders to bid on multiple items with a single bid. The combination, or bundle of items, is determined by the bidder. This is advantageous when the items exhibit complementarity, i.e., when the value of the bundle of items is worth more to the bidder than the sum of the separate item values, or substitutability, i.e., where different items are interchangeable to the bidder. Combinatorial bids allow bidders to express their true preference, resulting in the best economic allocation.

A drawback of combinatorial exchanges is that determination of winning bids that optimizes the objective is computationally intractable (NP complete). For example, the exchange objective could be to maximize the number of items traded, or to maximize surplus, that is, the difference between ask bid revenue and pay bid cost It is, therefore, an object of the present invention to provide an input specification mechanism that supports efficient processing in a way to maximize seller revenue while minimizing buyer cost. Still other objects of the invention will become apparent to those of ordinary skill in the art upon reading and understanding the following detailed description.

SUMMARY OF THE INVENTION

The invention is a method of processing an exchange. The method includes providing a solver/analyzer responsive to at least one bid for determining at least one of an infeasible allocation, a winning allocation and a feasible allocation, with each allocation including at least one allocation value. At least one bid is received at the solver/analyzer, with each bid including at least one item and an associated price. Exchange description data (EDD) is associated with the at least one bid. The EDD includes at least one of the features of reserve price, free disposal, non-price attribute, adjustment, objective, constraint, feasibility obtainer, constraint relaxer, conditional pricing and quote request. The associated EDD is received at the solver/analyzer and the at least one bid is processed by the solver/analyzer in accordance with at least one feature included in the associated EDD.

The invention is also a computer readable medium having stored thereon instructions, which, when executed by a processor, cause the processor to receive a plurality of bids, with each bid including at least one item and an associated price, and associate exchange description data (EDD) with at least one of the bids. The EDD includes at least one of the features of: reserve price, free disposal, non-price attribute, adjustment, objective, constraint, feasibility obtainer, constraint relaxer, conditional pricing and quote request. The at least one bid is processed in accordance with the at least one feature included in the associated EDD to obtain an allocation for the exchange.

BRIEF DESCRIPTION OF THE DRAWINGS

FIG. 4 is a diagrammatic illustration of an exemplary bid having exchange description data associated therewith;

FIG. 10a is a diagrammatic illustration of a counting requirement feature of an EDD;

FIG. 15 is a diagrammatic illustration of an objective feature of an EDD;

DETAILED DESCRIPTION OF THE INVENTION

The present invention is generally directed to a method of solving an exchange and, more particularly, to a method of processing one or more bids in a forward auction or exchange or one or more "asks" in a reverse auction or exchange in accordance with exchange description data associated with each bid or ask to achieve a desired exchange outcome.

Figure 1:
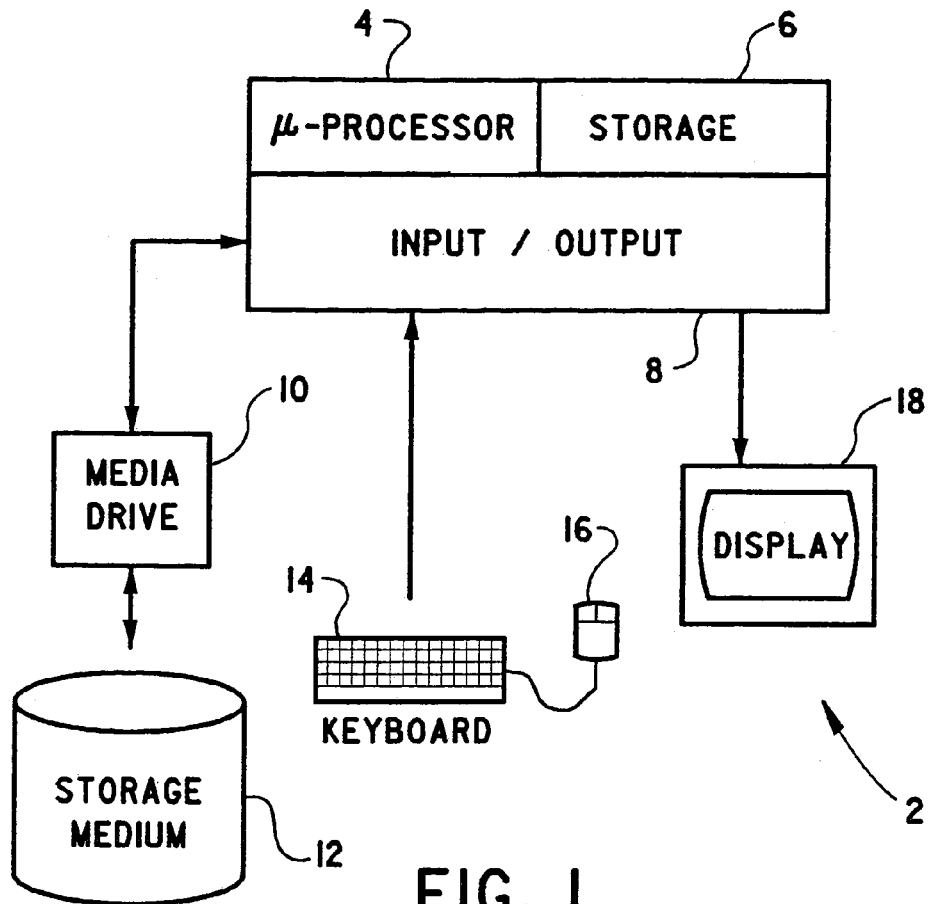
FIG. 1 is a diagrammatic illustration of an exemplary computer system that can execute computer readable program code that embodies the present invention.

With reference to FIG. 1, the present invention is embodied in computer-readable program code which executes on one or more computer systems 2. Each computer system 2 includes a microprocessor 4, a computer storage 6 and an input/output system 8. Each computer system 2 can also include a media drive 10, such as a disk drive, CD-ROM drive, and the like. Media drive 10 can operate with a computer-usable storage medium 12 capable of storing the computer software that embodies the present invention, which computer-readable program code is able to configure and operate computer system 2 in a manner to implement the present invention. Input/output system 8 can include a keyboard 14, a mouse 16 and/or a display 18. Computer system 2 is exemplary of a computer system capable of executing the computer-readable program code of the present invention and is not to be construed as limiting the invention.

In use, the computer-readable program code of the present invention enables a bidder, a seller or an exchange manager to associate processing instructions with one or more pay bids or ask bids. These processing instructions modify the manner in which a solver/analyzer (discussed hereinafter) processes the pay bids or ask bids.

Each pay bid or ask bid includes exchange data and can include associated processing instructions, "exchange description data" (EDD), which can be formed using the Extensible Markup Language (XML). However, the use of XML is not to be construed as limiting the present invention since the use of any other suitable computer language is envisioned.

For simplicity of description, the present invention will be described in connection with one or more pay bids issued in connection with a forward auction, one or more ask bids issued in connection with a reverse auction and/or one or more pay bids and/or ask bids issued in connection with an exchange.

Figure 2:
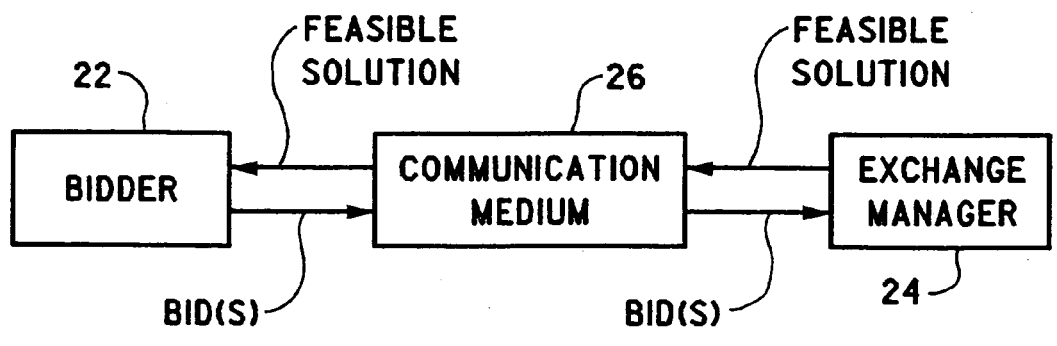
FIG. 2 is a generalized block diagram of a communication medium connecting entities participating in an exchange.
Figure 3:
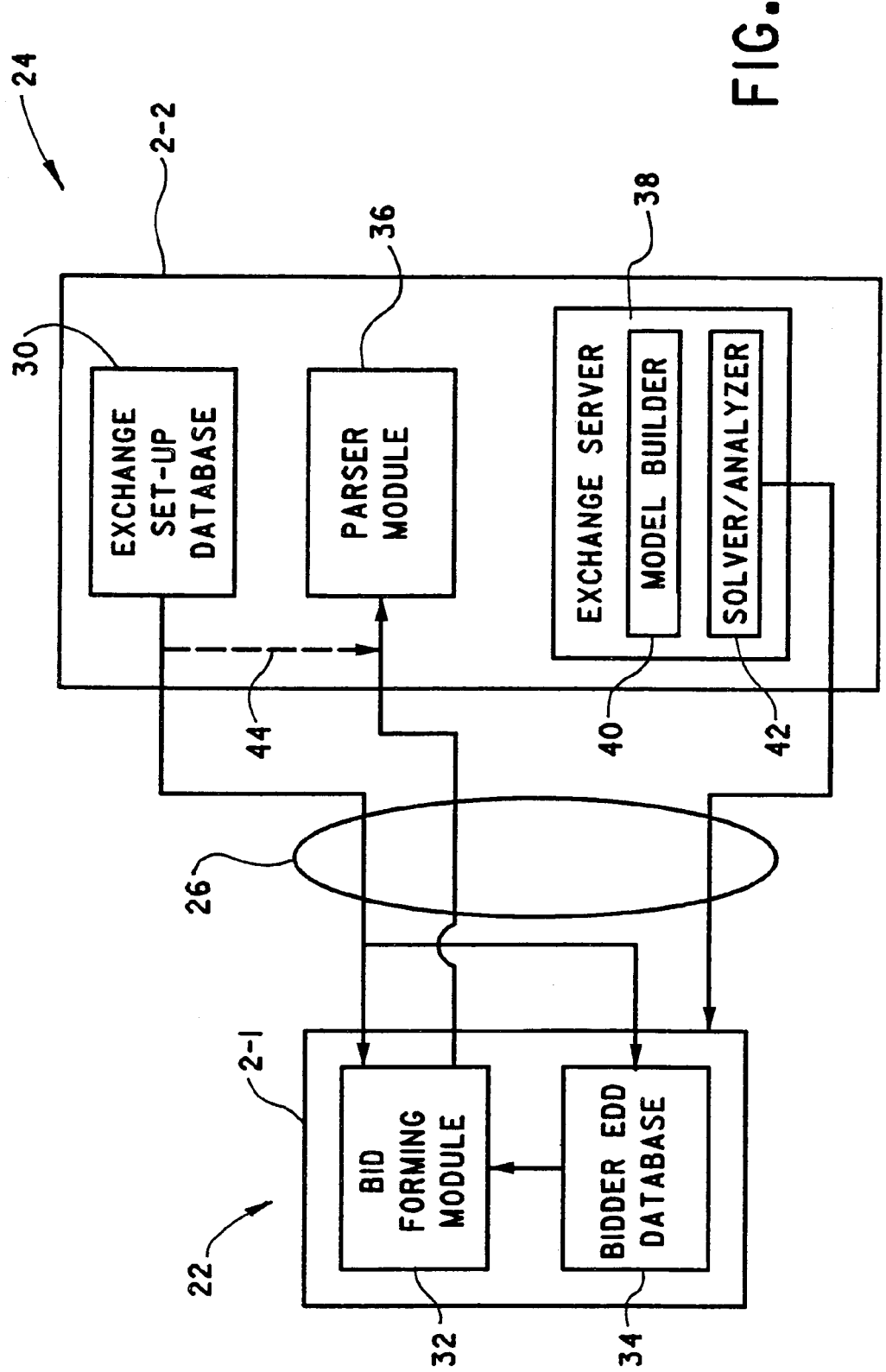
FIG. 3 is a detailed block diagram of the generalized block diagram shown in FIG. 2.

With reference to FIGS. 2 and 3, and with continuing reference to FIG. 1, one or more bids are conveyed from one or more bidders 22 to an exchange manager 24 via a suitable communication medium 26, such as the Internet, a local area network, a wide area network, etc. A bidder can be an agent acting on behalf of an actual bidder. More specifically, utilizing a computer system 2-2, exchange manager 24 inputs the items for the exchange into an exchange set up database 30 residing on computer system 2-2. Exchange manager 24 also includes the EDD (described in greater detail hereinafter) in exchange setup database 30. Exchange setup database 30 is not to be construed as limiting the invention since the use of a suitable database residing on computer system 2-2 or at a location other than computer system 2-2 is envisioned.

At a suitable time, bidder 22 downloads the exchange items from exchange setup database 30 into a bid forming module 32 and downloads some or all of the features of the EDD from exchange setup database 30 into a Bidder EDD database 34 residing on computer system 2-1. Utilizing bid forming module 32, bidder 22 forms one or more bids and/or or one or more bid groups for items that bidder 22 desires to buy and/or sell. A bid group includes a plurality of associated bids, where the associated bids can be selected randomly or the associated bids can be selected based on one or more attributes (discussed hereinafter). For example, an attribute can be utilized to restrict the bids forming a bid group to only those bids that are generated by a particular bidder and/or generated by bidders in a particular city. However, this is not to be construed as limiting the invention since the use of one or more additional or different attributes to qualify the bids of a bid group are envisioned.

If desired, prior to transmitting the formed bid or bid group to computer 2-2, bidder 22 can associate a feature from the EDD stored in Bidder EDD database 34 with each bid or bid group. Each EDD feature represents an instruction that a solver/analyzer 42 (discussed hereinafter) can utilize for processing the bid or bid group to achieve a desired outcome. Bidder EDD database 34 is not to be construed as limiting the present invention since a suitable database residing on computer system 2-1 or at a location other than computer system 2-1 is envisioned.

Once prepared, each bid or bid group and associated EDD feature(s), if any, is transmitted to computer 2-2 for processing. Computer 2-2 includes a parser module 36 that computer 2-2 utilizes to determine if the exchange data forming each bid or bid group and any associated EDD feature received from computer 2-2 is well-formatted, and, if a document type definition (DTD) or schema is referenced, determines if the exchange data forming each bid or bid group and any associated EDD feature is valid. If the bid, bid group or any associated EDD feature is not well-formatted or is invalid, parser module 36 rejects the bid or bid group and causes computer system 2-2 to issue a suitable error message. Otherwise, the bid or bid group and any associated EDD feature is parsed as validated exchange data and validated EDD feature(s) to an exchange server 38 for winner determination processing. Exchange server 38 can be a separate application running on computer system 2-2 or a separate server.

Exchange server 38 includes a model builder 40 which constructs a mathematical model of the exchange based on the validated exchange data and validated EDD feature(s) received from parser module 36. The form of this mathematical model depends on the capabilities of a solver/analyzer 42 that is utilized to process the model. For example, if solver/analyzer 42 is a linear or mixed integer program solver, then the model would include decision variables, with each variable having one or more associated bounds and/or constraints. For example, if solver/analyzer 42 is based on the method, apparatus and data structures for optimal anytime winner determination described in U.S. Pat. No. 6,272,473, incorporated herein by reference, then the mathematical model would include the binary tree structured search described therein. However, this is not to be construed as limiting the invention.

Solver/analyzer 42 determines the best allocation for validated exchange data and validated EDD feature(s). More specifically, solver/analyzer 42 determines feasible solutions, e.g., which bids should be awarded, and performs consistency checks against any EDD features. If the consistency checks are successful, solver/analyzer 42 outputs one or more feasible solutions. Each feasible solution includes an allocation value, winning bids and constraint values. Each feasible solution is then processed and/or formatted as necessary and forwarded to computer system 2-1.

In the foregoing description, bidder 22 associated one or more EDD feature(s) with one or more bids or bid groups transmitted to computer 2-2 for processing. However, exchange manager 24 can also or alternatively associate one or more EDD feature(s) with the one or more bids or bid groups received from bidder 22. This later association of one or more EDD feature(s) with one or more bids or bid groups received from bidder 22 is illustrated in FIG. 3 by dashed line 44.

Figure 4:
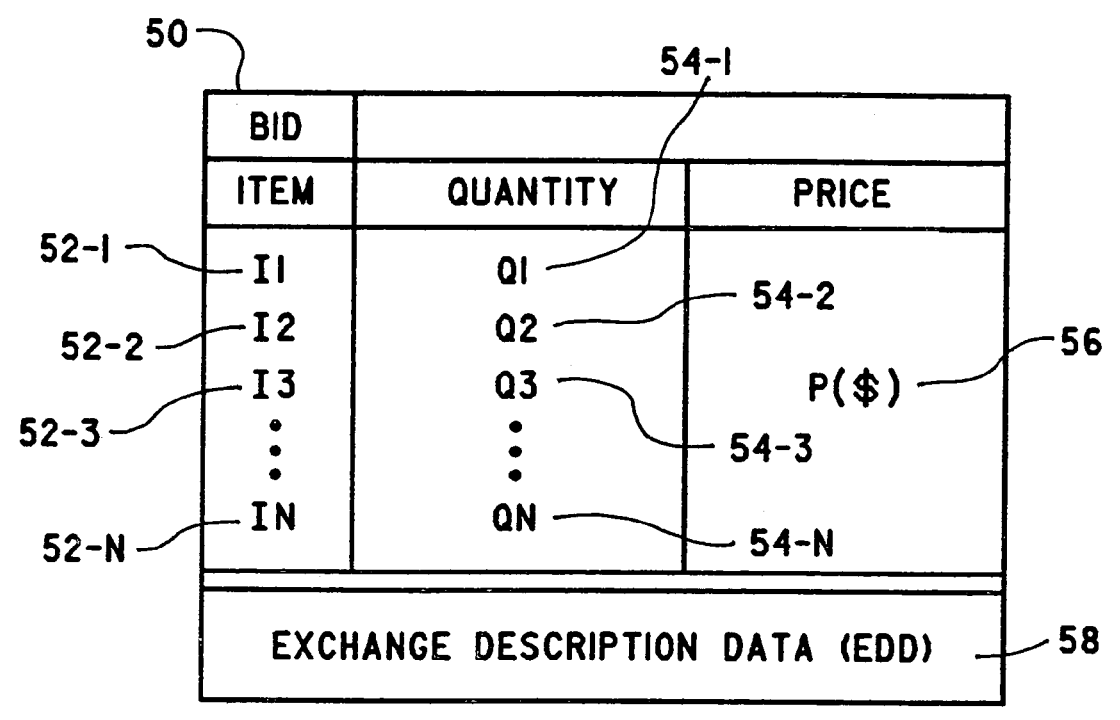

With reference to FIG. 4, and with continuing reference to FIGS. 1-3, an exemplary bid 50 input into parser module 10 includes one or more items 52-1, 52-2, 52-3 . . . 52-N having associated quantities 54-1, 54-2, 54-3 . . . 54N, respectively, and an associated bid price 56. In accordance with the present invention, bid 50 can also have EDD 58 associated therewith.

Figure 5:
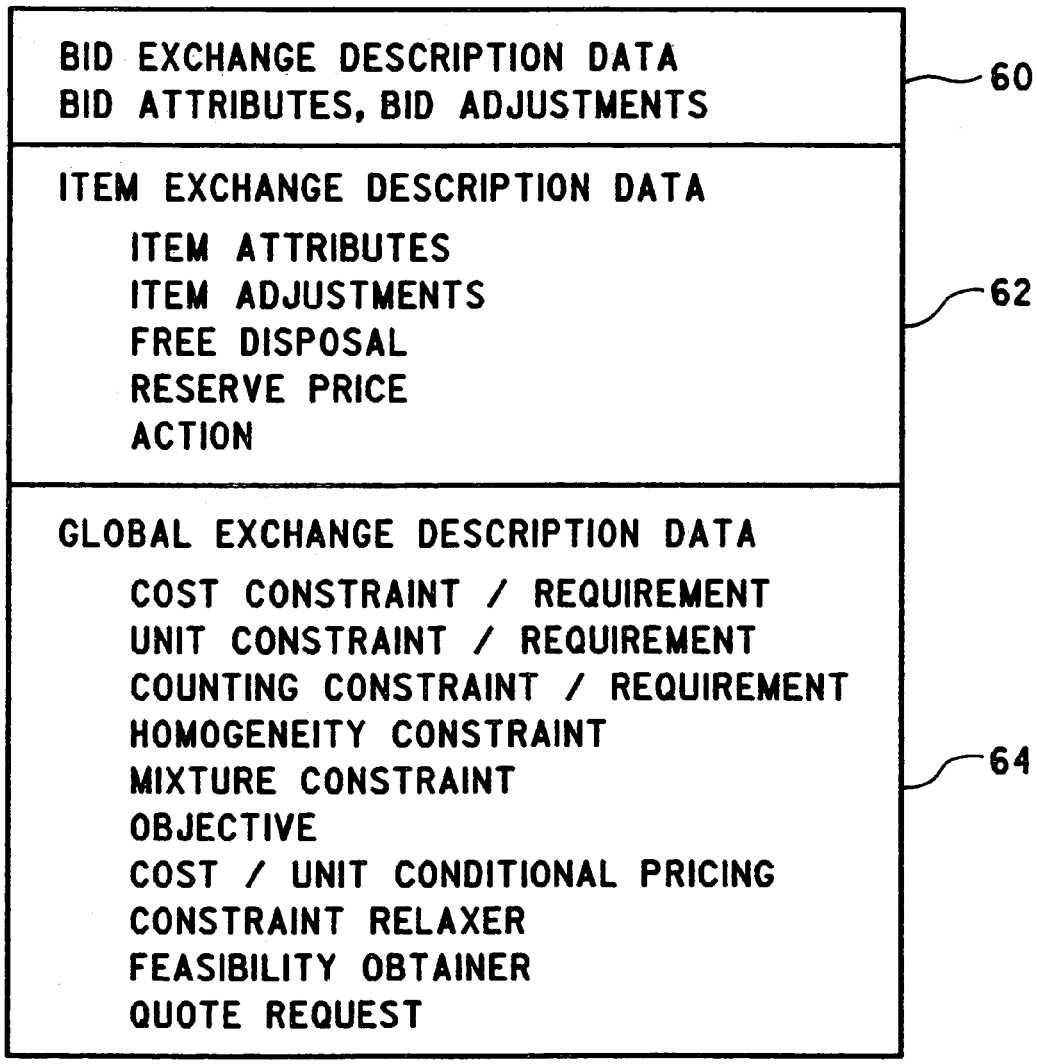
FIG. 5 is a list of exchange description data (EDD) features of the present invention.

With reference to FIG. 5, the EDD included in exchange setup database 30 includes bid EDD 60, item EDD 62 and global EDD 64. Bid EDD 60 includes the features of bid attributes and bid adjustments. Item EDD 62 includes the features of item attributes, item adjustments, free disposal, reserve price and action. Global EDD 64 includes the feature(s) of cost constraint/requirement, unit constraint/requirement, counting constraints/requirement, homogeneity constraint, mixture constraint, objectives, cost/unit condition pricing, constraint relaxers, feasibility obtainers and quote request. Each of these feature(s) will now be described in greater detail.

Figure 6:
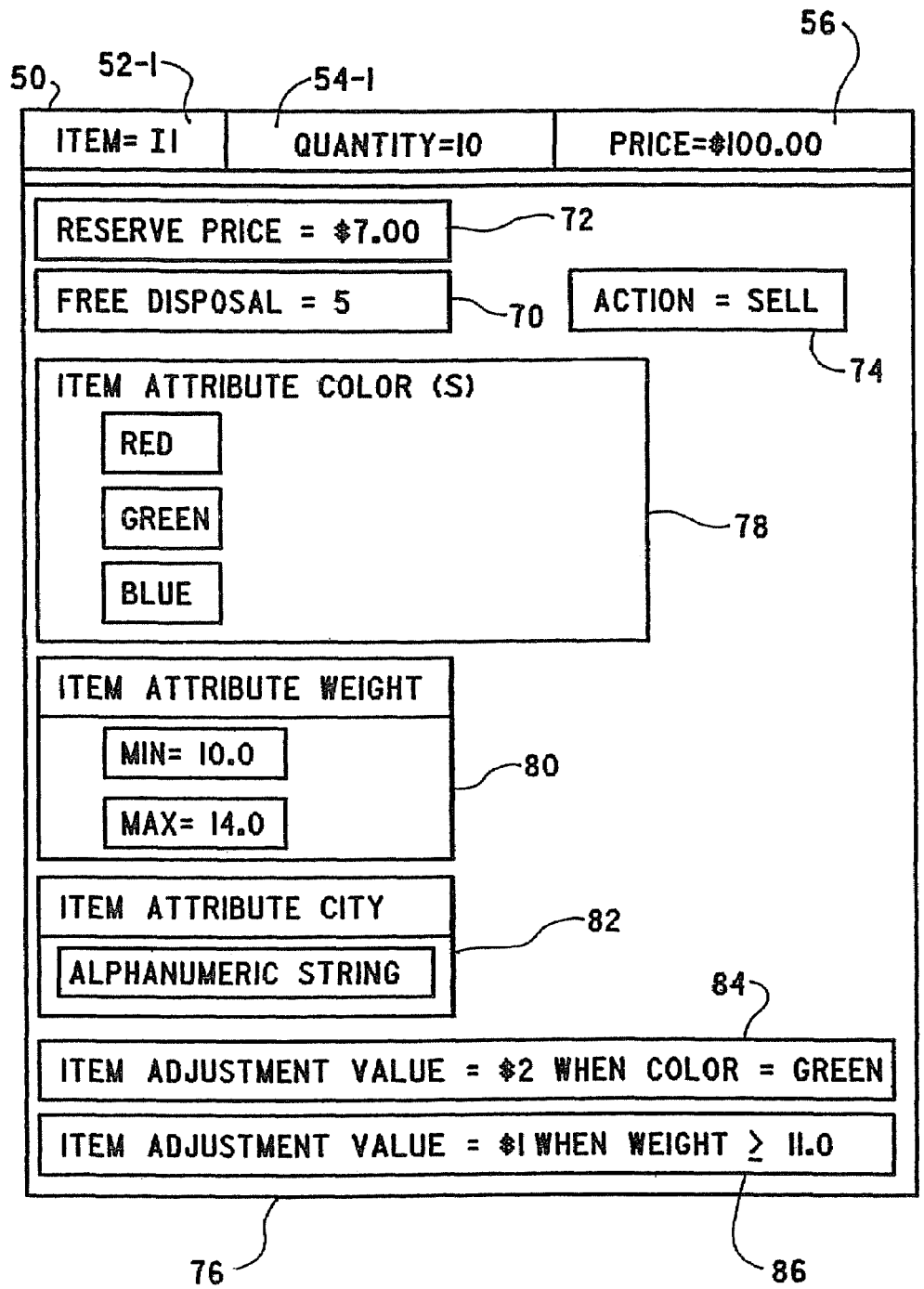
FIG. 6 is a diagrammatic illustration of a bid including an associated EDD having the features of free disposal, reserve price, action, item attribute and item adjustment associated therewith.

Item EDD:

With reference to FIG. 6, and with continuing reference to FIGS. 4, and 5, suppose that bid 50 only includes item 52-1 having a quantity 54-1 of 10 and a price 56 of $10.00. If bid 50 is created by a buyer, price 56 indicates the amount the buyer is willing to pay for the quantity 54-1 of item 52-1. In contrast, if bid 50 is created by a seller, price 56 is an amount the seller would like to receive for the quantity 54-1 of the item 52-1. However, bid 50 can include price 56 for a plurality of items 52, each of which has its own associated quantity. In FIG. 6, bid 50 has an Item EDD 76 associated therewith. EDD 76 can include the features of free disposal 70, reserve price 72 and/or action 74.

Action:

Action 74 has two settings; buy and sell. In a forward auction or exchange, action 74 is set to sell when item 52-1 is being sold. In a reverse auction or exchange, action 74 is set to buy when item 52-1 is being bought. In FIG. 6, action 74 is set to sell, indicating that item 52-1 is for sale. Quantity 54-1 associated with bid 50 specifies the total number of units for sale if action 44 is set to sell. However, if action 74 is set to buy, quantity 54-1 associated with bid 50 specifies the total number of units to purchase.

Free Disposal:

When a bidder is a seller, free disposal 70 enables the bidder to indicate a willingness to sell less than the specified item quantity 54-1, or when the bidder is a buyer, enables the buyer to a indicate a willingness to accept more than the specified item quantity 54-1, without affecting the bid price 56. Free disposal 70 may be used on both the supply side and demand side of all exchange formats, including forward auctions and reverse auctions. In bid 50 a seller offers a quantity 54-1 of ten of item 52-1 for sale and includes in EDD 76 associated with bid 50 a quantity of five in the free disposal feature 70 of bid 50. The combination of quantity 54-1 and free disposal feature 70 indicates that the seller is willing to sell between five and ten items.

Reserve Price:

Reserve price 72 of EDD 76 can be used to set the maximum price above which item 5-1 will not be bought, or minimum price below which item 52-1 will not be sold. In bid 50, a value of $7 is associated with the reserve price feature 72. This indicates that a seller or buyer does not wish to sell or buy any quantity of item 52-1 of bid 50 at a price below or above, respectively, $7.

Item Attribute(s):

EDD 76 can also or alternatively include for bid 50 item attributes that can be used by the bidder to complete or refine the specification for each item 52 of bid 50. For example, EDD 76 includes three item attributes: color 78, weight 80 and city 82 for item 52-1. For color item attribute 78, suppose that the only acceptable color values are red, green and blue. Weight item attribute 80 is defined to be a decimal numeric with minimum and maximum values, for example, of 10.0 and 14.0, respectively. City item attribute 82 is an alphanumeric string that can receive the name of any city. Other item attributes can include width, height, purity, concentration, pH, brand, hue, intensity, saturation, shade, reflectance, origin, destination, volume, earliest pickup time, latest pickup time, earliest dropoff time, latest dropoff time, production facility, packaging and flexibility.

If a bid specifies a color not listed in the color item attribute 78, a weight outside the range listed in weight item attribute 80 or a city not listed in city item attribute 82, the bid will be rejected by solver/analyzer 42. Otherwise, the bid will be processed by solver/analyzer 42

Item Adjustment(s):

EDD 76 can also or alternatively include for each item 52 of bid 50 any number of item adjustments. Each item adjustment includes a condition and value whereupon, if the condition holds, then the value is applied to the bid. In the example shown in FIG. 6, EDD 76 includes two item adjustments 84 and 86. Item adjustment 84 specifies that a value of $2 should be applied to a bid that is bidding on green colored item 54-1. Item adjustment 86 is a per unit additive adjustment. It specifies that a value of $1 should be applied to a bid for each unit of item 54-1 in a single unit bid where the item has a weight greater than or equal to 11.0.

Figure 7:
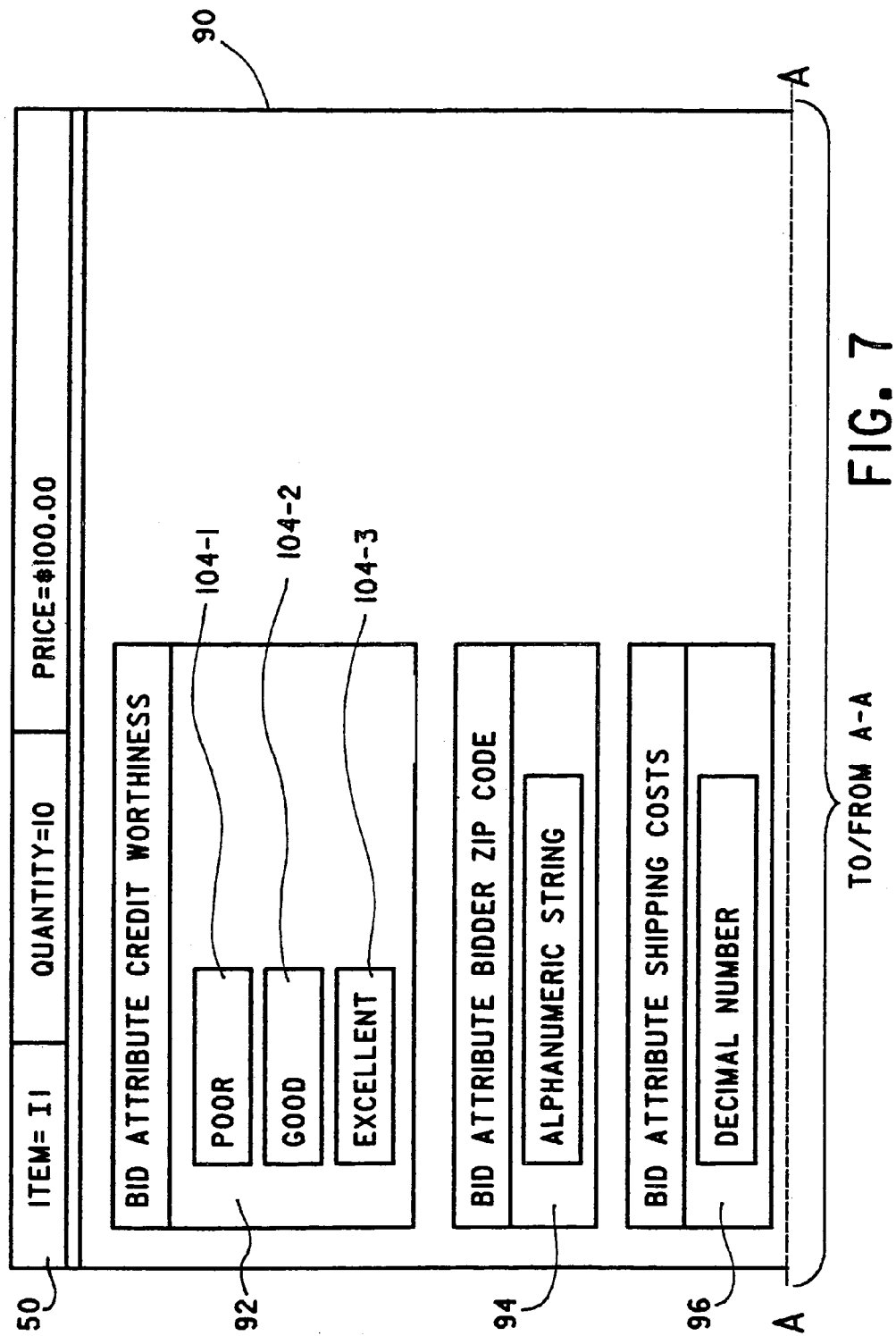
FIG. 7 is a diagrammatic illustration of a bid including an associated EDD having the features of bid attributes and bid adjustments.
Figure 7:
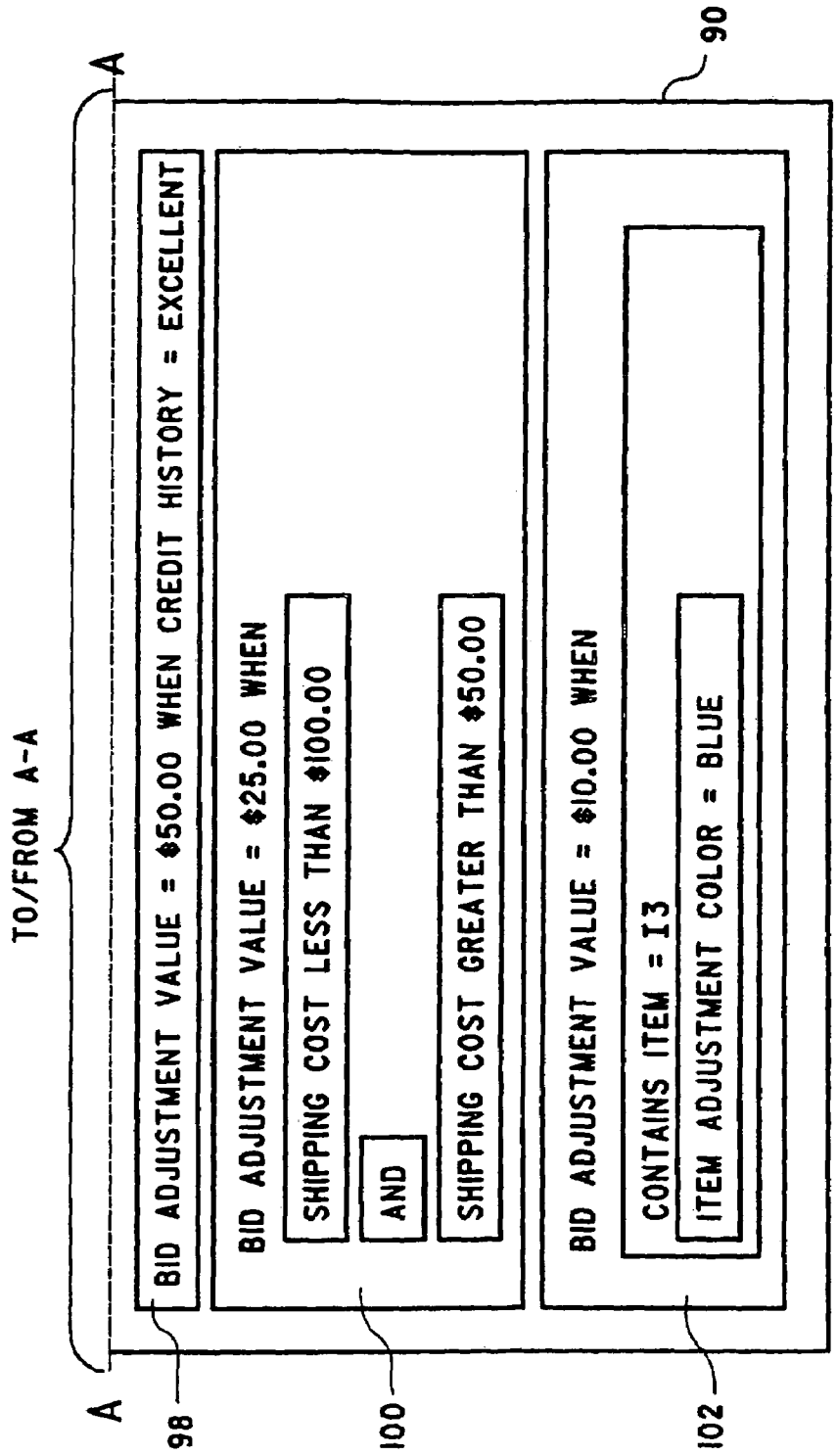

Bid EDD:

With reference to FIG. 7, bid 50 can also or alternatively include a Bid EDD 90 associated therewith. In contrast to the features of Item EDD 70, the features of Bid EDD 90 operate on the bid as a whole versus each item of a bid. EDD 90 is a specific example of Bid EDD 60 shown in FIG. 5. EDD 90 and EDD 76 include the features of bid adjustment(s) 98-102 and item adjustment(s) 84-86, respectively, that quantify the effects of non-price attributes, e.g., item attribute(s), discussed above, and bid attributes, discussed hereinafter. These attributes can be properties that allow incomplete item specification and, therefore, more economically efficient and participant-friendly marketplaces. Any measurable, quantifiable or qualitative attribute can be defined by the exchange manager or bidder to determine the parameters and character of the exchange.

Bid Attribute(s):

As items have attributes, so do bids. However, a bid attribute behaves a little differently. Where item attributes are used by buyers to complete or refine the specification of an item, bid attributes are used by potential acceptors of bids to differentiate among bids.

In FIG. 7, EDD 90 is associated with bid 50 and is processed by solver/analyzer 42 along with bid 50 and one or more other bid(s) (not shown). EDD 90 includes the features of bid attributes and bid adjustments. Exemplary bid attribute(s) include credit worthiness 92, bidder location 94 and shipping cost 96. Credit worthiness 92 has three exemplary selections by which bid 50 can be set to a level of credit worthiness of the bidder. If the attribute for credit worthiness is set to "Poor" 104-1, it tells solver/analyzer 42 that the bidder of bid 50 has bad credit. Likewise, the bid attributes for credit worthiness 104 of "Good" 104-2 and "Excellent" 104-3 signifying their respective rankings of the bidder's credit worthiness. The selection of credit worthiness in EDD 90 is typically made by exchange manager 24 instead of the bidder of bid 50 to avoid falsification of this selection.

The bid attribute for bidder location 94 provides the location of the bidder. This is given as an alphanumeric string so that any possible string combination can be entered. The bid attribute shipping cost 96 stores the cost of shipping those items that the bidder has bid on. Bid attribute shipping cost 96 is a decimal field in which the amount of the shipping cost can be entered. Other exemplary bid attributes can include bidder reliability, bidder reputation, bidder timeliness, freight terms and conditions, insurance terms and conditions, bidder distance and bidder flexibility.

Bid Adjustment(s):

EDD 90 can also include bid adjustments 98, 100 and 102 that are similar syntactically to the item adjustments previously described. The following numerical examples of bid adjustments 98 and 100 are for the purpose of illustration and are not to be construed as limiting the invention. Bid adjustment 98 is for $50 and depends on whether the bid attribute for credit worthiness 92 is set to "Excellent" 104-3. If solver/analyzer 42 determines that the bid attribute for credit worthiness 92 is set to "Excellent" 104-3, the price of bid 50 is decreased (or increased) by $50. If the bid attribute for credit worthiness 92 is set to "Poor" 104-1 or "Good" 104-2, the price of bid 50 remains unchanged. Bid adjustment 100 has a value of $25 that is applied when the bid attribute for shipping cost 96 is between $50 and $100. In this example, the only time a bid adjustment value is applied to bid 50 is when shipping cost attribute 96 is greater than $50 and less than $100. Bid adjustment 96 also illustrates the use of the logical operator AND as a connector between an attribute and an adjustment. In addition to AND, the logical operators OR and NOT can also be utilized as connectors. Moreover, logical operators may be nested within other logical operators.

In bid adjustment 100, the determination of whether the actual shipping cost falls between a range is made using tests. The first test is based on the actual shipping cost being less than a first value, in this example $100. The second test is based on the actual shipping cost being greater than a second value, in this case $50. Each of these tests, i.e., "less than" and "greater than", are from a group of operators over non-price attributes. These operators include "equal to" "less than" "less than" or "equal to" "greater than" "greater than or equal to" and "contains item".

Each bid adjustment 98, 100 and 102 is expressed as a conditional test. Namely, if the condition holds, then the specified adjustment is applied. More complex expressions allow dependence of whether the adjustment is applied based on multiple attributes.

Bid adjustment 102 demonstrates the "contains item" adjustment. This adjustment serves two purposes. The first is obvious from its name: it tests whether or not a bid contains an item. It should be appreciated that the contains item adjustment can only be used in a bid adjustment. In the example shown in FIG. 7, bid adjustment 102 specifies that any bid that contains Item I3 should have a value of $10 dollars applied to the value of the bid price. The second use for the "contains item" adjustment is for referencing item attributes inside of a bid adjustment. In the example shown in FIG. 7, bid adjustment 102 specifies that a value of $10 should be applied to bid 50, which contains Item I3. In addition, an item adjustment of bid adjustment 102 specifies that the color of Item I3 must be blue for the value of $10 to be applied to bid 50.

Each bid adjustment is typically one of two exemplary types: additive or multiplicative. Additive adjustments apply a positive (or negative) amount to a bid if the condition holds for that bid. Additive adjustments can either be absolute or per unit. Absolute additive adjustments are simply applied to the bid if the condition holds. Per unit additive item adjustments are multiplied by the number of units of the item in the bid before application to the bid. Multiplicative adjustments can only be used with bid adjustments, they cannot be used with item adjustments. Multiplicative adjustments apply a specified percentage correction to a bid if the condition holds. If the percentage is positive, the correction increases the value of the bid. If the percentage is negative, the correction decreases the value of the bid. These particular adjustments are not to be construed as limiting the invention since other suitable adjustments can also be utilized.

Global EDD:

As shown in FIG. 5, global EDD 64 can include constraint features, requirement features, objectives, cost/unit condition pricing, constraint relaxers, feasibility obtainers and quote requests which will be now be described in greater detail.

Constraint(s):

There are several broad categories of constraint features including cost constraints, unit constraints, counting constraints, homogeneity constraints and mixture constraints. Generally, constraints are limits imposed on some aspect of the outcome of an allocation. For example, a constraint can limit the maximum number of winning buyers in a forward auction or the maximum number of winning sellers in a reverse auction. Another constraint can limit the currency volume sold to any one bidder. Still further, another constraint can limit the quantity of an item that a single supplier can supply. The purpose of constraints is to facilitate the management of solver/analyzer 42 so that feasible solutions are returned which meet the objectives of the market. To this end, constraint features of global EDD 64 are typically associated with a bid or bid group by exchange manager 24. However, this is not to be construed as limiting the invention. Constraints ensure that the allocation conforms to minimum and/or maximum specified limits.

Cost Constraint(s):

With reference to FIG. 8(*a*), a cost constraint feature 110 of global EDD 64 restricts the winning allocation by establishing a limit that is based on winning bid prices and quantities. In an example of establishing this limit, two bid groups 112 and 114 are created. Bid group 112 is the constrained group and bid group 114 is the control group. Bid group 114 is shown in FIG. 8(*a*) for illustration purpose, but it is assumed to be an empty group. There can be many reasons to constrain a group of bids. For example, an exchange may have a need to limit the sum of the prices all of the bids from bidders of a first city. Accordingly, a bid group is established with all of the bidders from the first city. It may also be desirable to limit the bidders from the first city as compared to a second city.

Cost constraint 110 causes solver/analyzer 42 to compare the two bid groups with respect to the sums of the prices of their winning bids. If the comparison is based on percentage, then the sum of the prices of the winning bids of the first bid group divided by that of the second bid group must be less than the constraint maximum limit, if any, and greater than the constraint minimum limit, if any. If the comparison is absolute, then the sum of the prices of the winning bids of the first bid group must be at least the minimum limit, if any, more than that of the second bid group, and at most the maximum limit, if any, less than that of the second bid group. For a comparison based on percentage, to avoid division by zero (0) when the second bid group 146 does not exist, an imaginary second bid group (not shown) is created that contains all of the winning bids. The comparison based on percentage is then determined by dividing the sum of the quantity of items of the winning bids of bid group 144 by that of the imaginary second bid group and comparing the solution to the maximum percentage constraint, if any, and/or the minimum percentage constraint, if any.

For example, suppose that a forward auction includes a plurality of bids where four bids 116-1-116-4 are made by bidders who fall into a group of interest where it is desirable to limit, based on cost, the value of the bids of this group. Suppose that the four bidders are from Tucson and, for this auction, there is a rule that bidders from Tucson may only be allocated a maximum limit of 25% of the total value of the auction. In this example, because it is desired to limit the auction solution as to the value of the bids of the Tucson bidders, cost constraint 110 includes bids 116-1-116-4 forming bid group 112 which is limited by maximum limit constraint 118 to 25% of the total allocation value. In other words, if the value of bid group 112 is over 25% of the total allocation value, the solution is infeasible. If desired, cost constraint 110 can also or alternatively include a minimum limit constraint 102 which is utilized to establish a lower limit on the total allocation value.

Cost constraints are strict constraints. A strict constraint must be satisfied or the allocation is infeasible. For example, a cost constraint can limit a bidder to receive at least 50% of the total allocation value. For example, suppose a bidder places a bid having a value of $11 in an exchange where the total allocation value of the exchange is $21. Then, the value of the constraint is $11/$21 or 52.38%. Since 52.38% is greater than the cost constraint of 50%, the allocation is feasible. However, if the cost constraint is raised to 60%, the allocation is infeasible because 52.38% is less than 60%. In some situations, it may be desirable for the bidder to be required to win at least 50% of the allocation, or else be awarded no allocation.

Figure 8A:
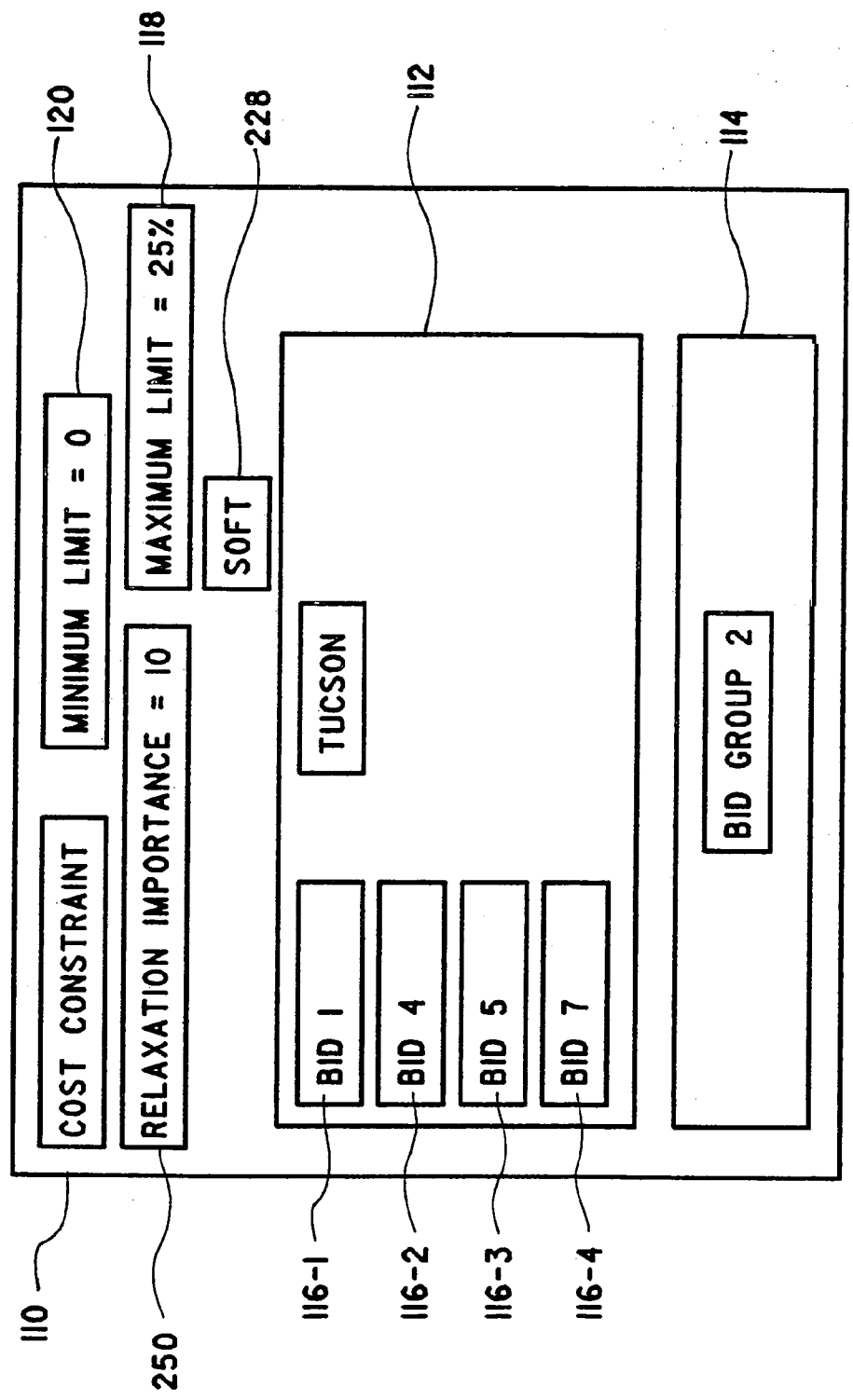
FIG. 8a is a diagrammatic illustration of a cost constraint feature of an EDD.
Figure 8B:
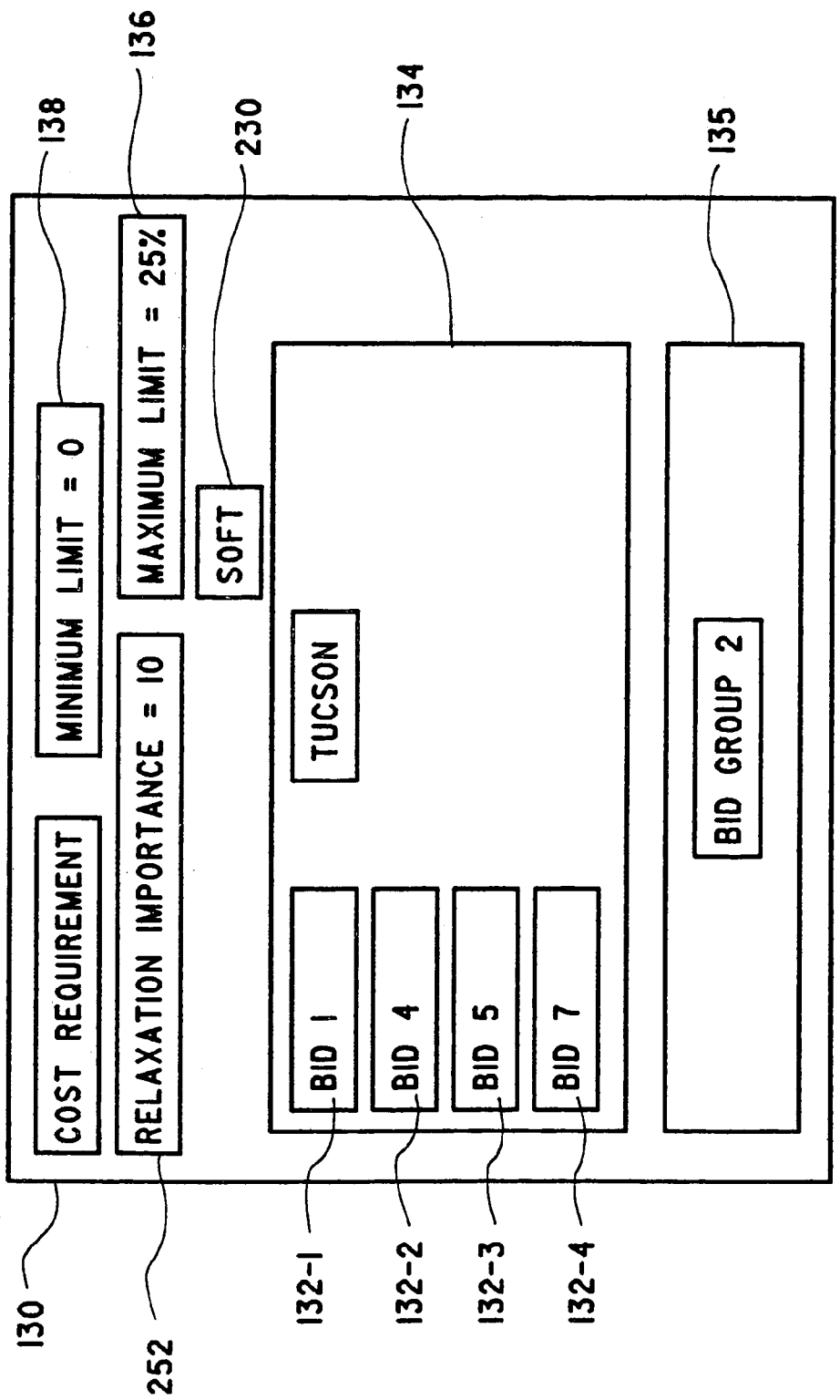
FIG. 8b is a diagrammatic illustration of a cost requirement feature of an EDD.

Cost Requirement(s):

With reference to FIG. 8(b), a cost requirement feature 130 of global EDD 64 enables solver/analyzer 42 to withhold a bid or bid group from an allocation if the limitation is not satisfied. Cost requirement 130 is syntactically similar to a cost constraint. However, where a cost constraint makes the solution infeasible, a cost requirement enables solver/analyzer 42 to construct an allocation, where a bid or bid group that otherwise would be allocated is withheld from the allocation because a limitation on the bid or bid group is not satisfied. In other words, the difference is in the scope of the limit. For a cost constraint, in the event that the limit is not met, the whole allocation is infeasible. In contrast, a cost requirement only directly affects the bid or bid group under the constraint. There is still the all or nothing limitation as in the cost constraint. However, in the case of a cost requirement, if a limit is placed and not met, then the bidder receives nothing, but the allocation not necessarily infeasible.

For example, assume that a forward auction includes a plurality of bids where four bids 132-1-132-4 are made by bidders who fall into a group of interest where it is desired to limit, based on cost, the value of the bids of the particular bidders. Suppose that the four bidders are from Tucson and for this auction there is a rule that bidders from Tucson may only be allocated 25% of the total value of the auction, or else the Tucson bidders get nothing at all. In this example, because it is desired to limit the auction solution as to the value of the bids of the Tucson bidders, cost requirement 130 includes bids 132-1-132-4 forming bid group 134 which is limited by a maximum limit constraint 136 to 25% of the total allocation value. In other words, if the sum of the values of bids 132-1-132-4 exceeds 25% of the total allocation value, the Tucson bidders receive nothing in the winning allocation. In order for bid group 134 to be allocated the items associated with bids 132-1-132-4, the sum of the values of these bids must be less than the maximum limit constraint 136. If desired, cost requirement 130 can also or alternatively include a minimum limit constraint 138 which is utilized to establish a lower limit on the total allocation value.

Figure 9A:
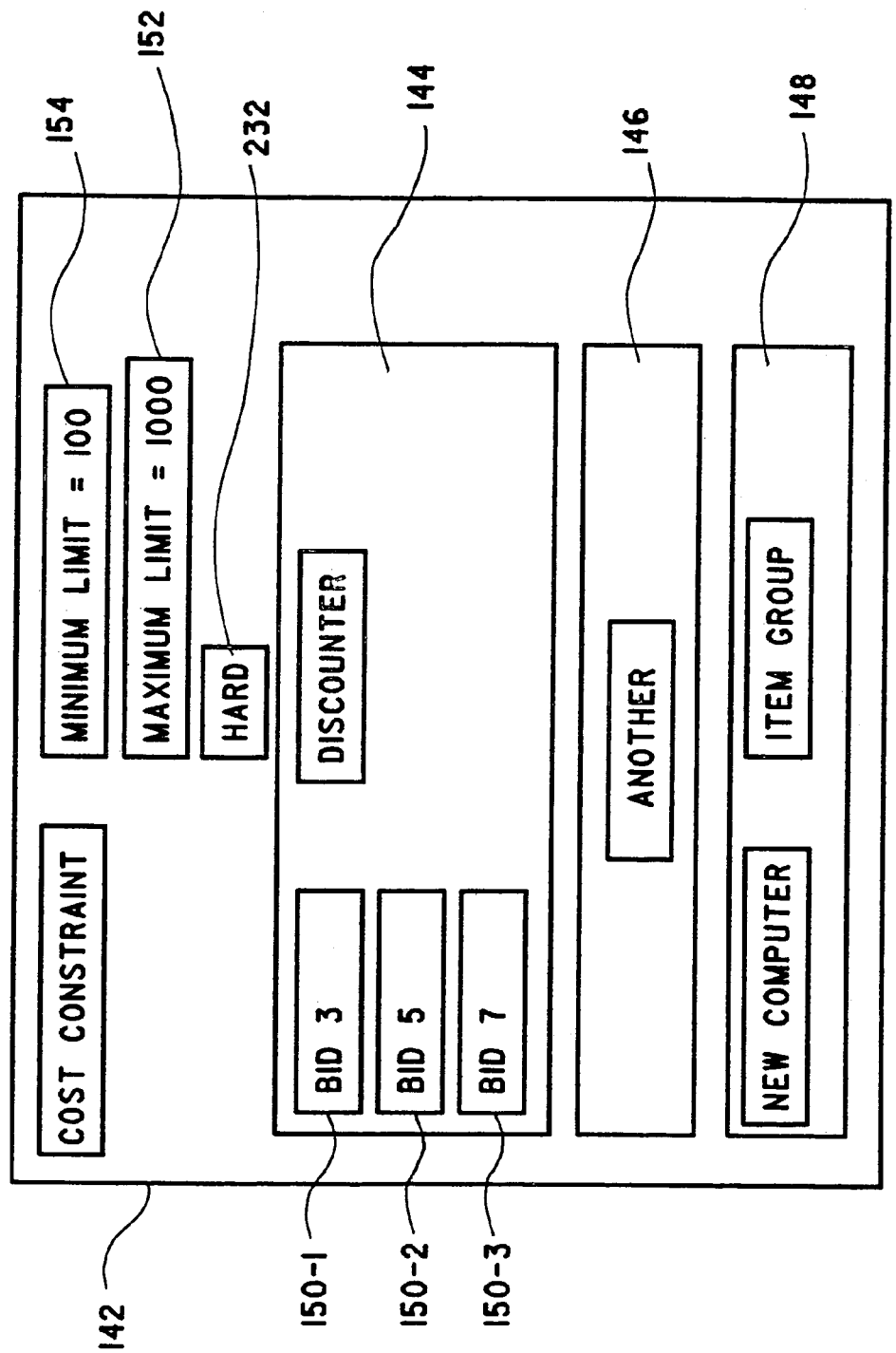
FIG. 9a is a diagrammatic illustration of a unit constraint feature of an EDD.

Unit Constraint(s):

With reference to FIG. 9(a), a unit constraint feature 142 of global EDD 64 restricts the winning allocation by setting up a limit which is based on a quantity of items that are bought and/or sold in winning bids. In an example of setting this limit, bid groups 144 and 146 and an item group 148 are created. Unit constraint 142 causes solver/analyzer 42 to compare bid group 144 and bid group 146 with respect to the sums of the number of items listed in the respective item group 148 of their winning bids.

For example, suppose that a forward auction includes a plurality of bids where three bids 150-1-150-3 are made by a particular bidder where it is desired to limit the quantity of items awarded to that bidder. In this example, suppose that the bidder is a buyer from a very large computer discount sales company and that each of the three bids is for as many units as are available of the new computer. Moreover, suppose that 2000 of these computers are available and that there is a need to distribute some of the computers to other buyers in order to facilitate the development of a wide customer base. Lastly, suppose that it is desired to limit the quantity of computers awarded to the bidder to one-half of the available computers, or 1000 computers. Since it is desired to limit the bidder, unit constraint 142 is formed with bid group 144 including bids 150-1-150-3. The item of bid group 144, e.g., new computers, is added to item group 148. A value, e.g., 1000, associated with item group 148 is designated as a maximum limit constraint 152 of unit constraint 142 for limiting the maximum quantity of computers bid group 144 can be awarded to no more than 1000 units. When the winning allocation is returned, the computer discount sales company is allocated no more than 1000 units by solver/analyzer 42. In this example, item group 148 included only computers. However, any part or item that would be useful to limit in such a manner can also or alternatively be included in item group 148.

As in cost constraints, there are two types of comparisons that can be made for a unit constraint. Namely, an absolute comparison, as in the foregoing example of limiting the number of computers to a computer discount sales company, and a comparison based on percentage. In a comparison based on percentage, the sum of the number of items in the winning bids of bid group 144 must be at most a maximum limit, if any, different than that of bid group 146. In this example, bid group 146 is empty. This means that the quantity of items awarded to bid group 144 is limited to no more than 1000. However, a suitable value can be included in a minimum limit constraint 154 for limiting the minimum quantity of computers bid group 144 can be allocated to at least 1000 units. For a comparison based on percentage, the sum of the quantity of items of the winning bids of bid group 144 divided by that of the bid group 146 must be less than a maximum percentage constraint (not shown) if any, and/or greater than a minimum percentage constraint (not shown) if any. The maximum percentage constraint and the minimum percentage constraint can also be the same. For a comparison based on percentage, to avoid division by zero (0) when the second bid group 146 does not exist, an imaginary second bid group (not shown) is created that contains all of the winning bids. The comparison based on percentage is then determined by dividing the sum of the quantity of items of the winning bids of bid group 144 by that of the imaginary second bid group and comparing the solution to the maximum percentage constraint, if any, and/or the minimum percentage constraint, if any.

For example, assume it is desired to limit the quantity of items awarded the bidder associated with bid group 144. Accordingly, unit constraint 142 would include a maximum percentage constraint (not shown) that solver/analyzer 42 utilizes to limit the quantity of computers awarded the bidder to no more than one-half of the available quantity. Since the items for this example are included in bids 150-1-150-3, item group 148 is not needed.

Unit constraints, like cost constraints, are strict constraints. Namely, a strict constraint must be satisfied or the allocation will be infeasible. For example, a unit constraint can limit a bidder to receive at least 1000 units of an item in an auction. This forces the bidder to have at least 1000 units in the auction. Thus, if a bidder places two bids that are awarded 500 units of an item and 1000 units of the item, since this bidder satisfied the limit of at least 1000 units of an item, the allocation is feasible. However, if the bidder places the same bids, but the total quantity of the item of all the bids did not add to 1000 units, then the solution is said to be infeasible, and there is no solution.

Figure 9B:
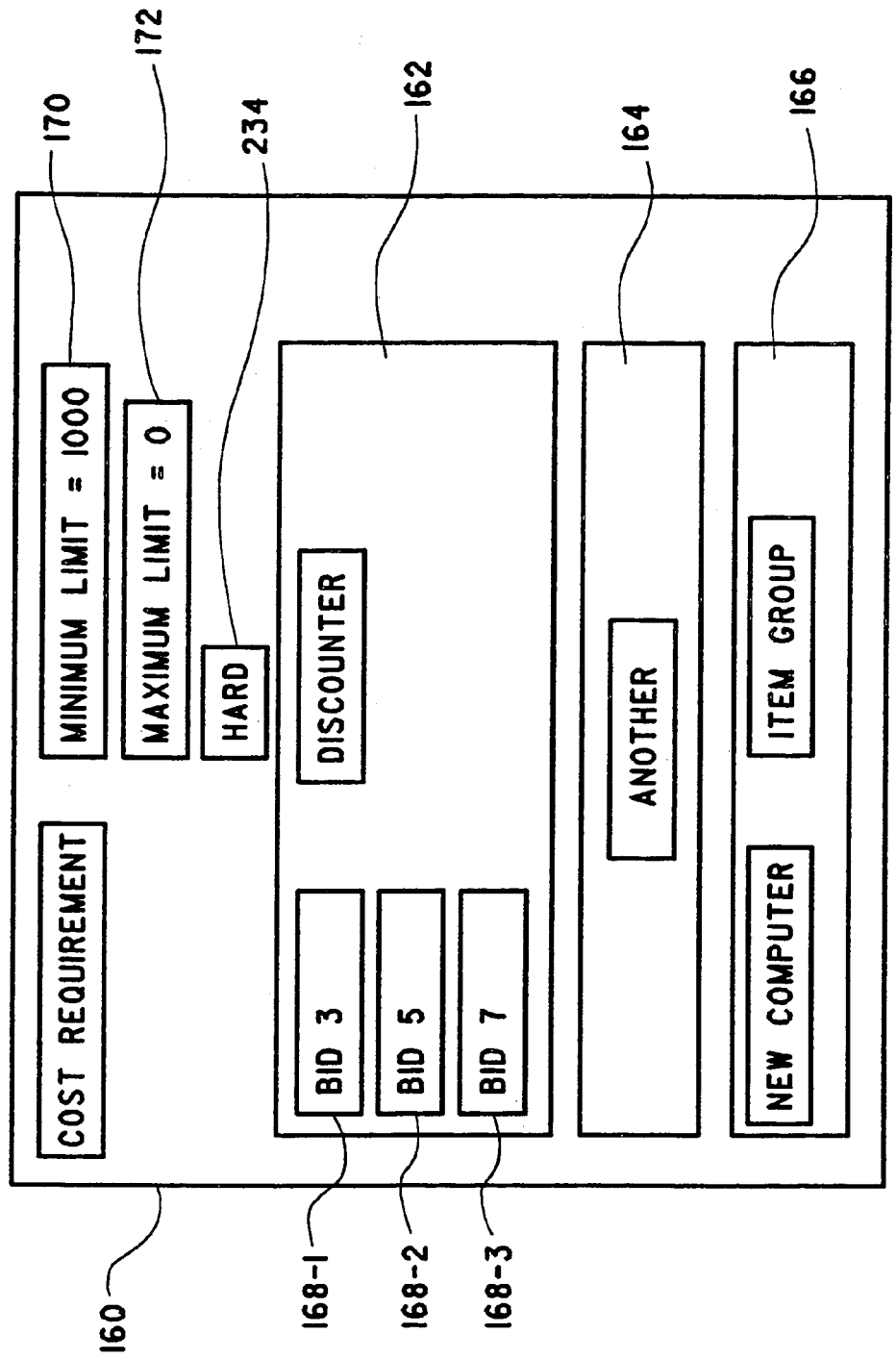
FIG. 9b is a diagrammatic illustration of a unit requirement feature of an EDD.

Unit Requirement(s):

With reference to FIG. 9(*b*), a unit requirement feature 160 of global EDD 64 does not contain the same restriction as a unit constraint. A unit requirement allows for a quantity of zero to be allocated to a bidder to provide a winning allocation. The difference is in the scope of the limit. A unit requirement is syntactically similar to a unit constraint. However, where a unit constraint makes the solution infeasible, a unit requirement allows a quantity of zero to be allocated. Stated differently, for a unit constraint, where the limit is not met, the whole allocation is infeasible. In contrast, for a unit requirement, where the limit is not met, only the bid group associated with the unit constraint is not allocated.

For example, suppose a forward auction includes a plurality of bids where three bids are made by a particular bidder to whom it is desired to limit the quantity of items awarded the bidder. Suppose that the bidder is a buyer from a very large computer discount sales company and the three bids are for a new computer. For this exchange, there is a need to sell all the computers as quickly as possible. Accordingly, it is desired to sell a large quantity of the available computers to the computer discounter because this is a large company that can resell many computers. Therefore, unit requirement 160 of global EDD 64 is created such that the bidder (discounter) must be awarded at least 1000 computers. Since it is desired to limit the bidder, a bid group 162 is formed that includes bids 168-1-168-3. The items for this example, i.e., new computers, are added to item group 166. Bid group 162 is then limited to at least 1000 units of item group 166 it can be awarded by including the value 1000 as a minimum limit constraint 170 and by including the value of zero as a maximum limit constraint 172. In this example, the bidder will be allocated 1000 or more computers, or no computers. If the bidder is allocated no computers, however, this is still a feasible solution.

Counting Constraint(s):

With reference to FIG. 10(*a*), a counting constraint feature 180 of global EDD 64 involves outcome parameters. Outcome parameters are those besides bid and item allocations and net exchange revenue. An example is a legally imposed constraint, such as an award of a minimum percentage of an allocation to minority firms. There may also be a market domination concern that compels an award of a maximum percentage of an allocation to one or a group of firms that may be specified. Another common example is to ensure that a certain percentage of the business goes to a specific firm, because of a long-standing business relationship. Still another example would be to condition an award to a bidder to at least a certain percentage of the allocation to avoid giving the bidder such a small amount of business that it does not cover operating expenses.

For example, counting constraint 180 of global EDD 64 includes a value of four as a maximum limit constraint 182 on the number of winning bidders. In this example, there are six bidders and it is assumed, but not shown, that each bidder has placed a number of bids in the auction. The bids of each bidder are formed into bid groups 184-1-184-6, with bid group 184-1 including all the bids that placed by bidder 1, with bid group 184-2 including all the bids placed by bidder 2, and so forth. The value of four as maximum limit constraint 182 constrains the allocation made by solver/analyzer 42 to four bid groups out of the six that were created. Maximum limit constraint 182 causes solver/analyzer 42 to form a winning allocation that has no more than four of bid groups 184-1-184-6. Since bid groups 184 in this example represent bidders, the counting constraint has effectively limited the number of winners.

With continuing reference to FIG. 10(*a*), suppose that the value of maximum limit constraint 182 is set to zero and a value of four is included in a minimum limit constraint 186. This will cause the winning allocation to include at least four of the bidders 184 included in counting constraint 180. Moreover, both maximum limit constraint 182 and minimum limit constraint 186 may be set to values wherein the desired number of winners falls within the range of values.

Counting Requirement(s):

With reference to FIG. 10(*b*), a counting requirement feature 190 of Global EDD 64 has the same syntax as a counting constraint, but differs in outcome. The difference between a counting constraint and a counting requirement is that the counting requirement with a minimum limit constraint value greater than zero will also allow a value of zero. For example, suppose that counting constraint 180 in FIG. 10(*a*) has a value of four included as its minimum limit constraint 182. Then, four or more of bid groups 184-1-184-6 must win or the solution is infeasible. In contrast, suppose a counting requirement feature 190 shown in FIG. 10(*b*) has a value of four as its minimum limit constraint 192. Then, at least four of the bid groups 194-1-194-6 must win or none of these bid groups win. Hence, the solution is still feasible.

Figure 11:
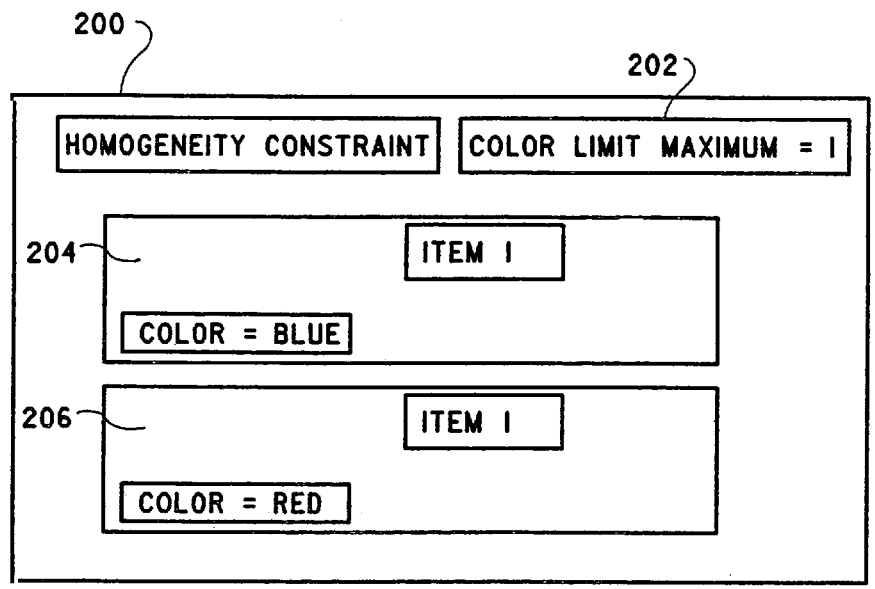
FIG. 11 is a diagrammatic illustration of a homogeneity constraint feature of an EDD.

Homogeneity Constraint(s):

With reference to FIG. 11, a homogeneity constraint feature 200 of global EDD 64 enables limits to be placed on bids. With a homogeneity constraint, a limit based on an item attribute or a bid attribute can be placed on a bid. For example, in FIG. 6, item 52-1 has an item attribute color 78. Suppose a homogeneity constraint of global EDD 64 is needed in addition to the features of EDD 76 to limit the number of represented colors in all of the specified items of awarded bids, where the award of an item of green color is irrelevant, even though it is one of the colors for that item attribute. Accordingly, homogeneity constraint 200 of global EDD 64 can be created having color limit maximum constraint 202 value of one. Color limit maximum constraint 202 causes solver/analyzer 42 to limit to a quantity of one the items that are listed in item attribute descriptions 204 and 206, where item attribute description 204 limits the homogeneity constraint of an Item 1 to the color blue and item attribute description 206 limits the homogeneity constraint of Item 1 to the color red. In response to homogeneity constraint 200, the allocation would not exceed one of the two colors of blue and red items, but any number of green items could be awarded since green was not included in homogeneity constraint 200. Thus, one blue item—or one red item, and/or any number of green items may be allocated. As can be seen, the homogeneity constraint ensures that no more than one of the specified colors will appear in the allocation. Since only the colors specified in homogeneity constraint 200 are considered for purposes of homogeneity, any other color, in this example green, included in color item attribute 78 in FIG. 6 can also appear in the allocation. A limit minimum can also or alternatively be included in homogeneity constraint 202 for limiting the minimum quantity for an item awarded in an allocation or to establish a range of an item awarded in an allocation.

The foregoing example shows one item per item attribute description 204, 206. However, multiple items may appear in each item attribute description 204, 206. These items form an equivalence class for the purpose of homogeneity. For example, to consider cyan to be the same as blue when assessing homogeneity, it can be added to the item group that contains blue.

Figure 12:
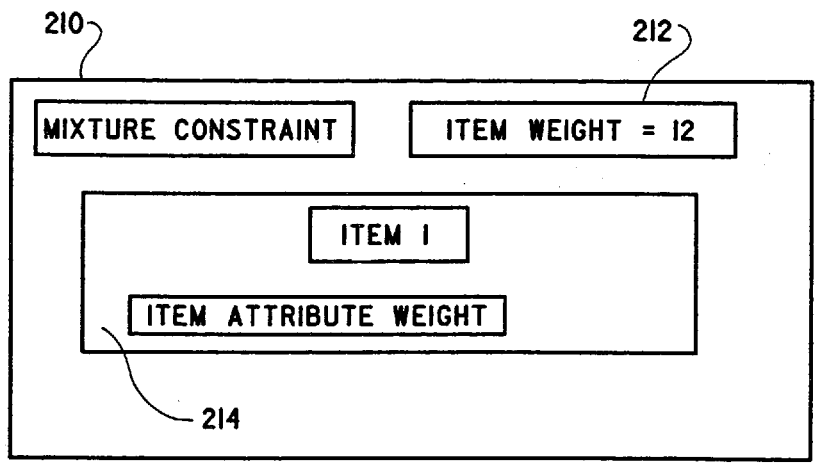
FIG. 12 is a diagrammatic illustration of a mixture constraint feature of an EDD.

Mixture Constraint(s):

With reference to FIG. 12, a mixture constraint feature 210 of global (EDD) 64 allows for mixing of attributes of interest. In the previous example, a homogeneity constraint limited by maximum or minimum the different colors represented in all of the specified items of all of the specified winning bids. A mixture constraint will still limit by attribute, similar to homogeneity constraint 200, but it also allows any combination of bids or items to be selected in fulfilling that limit. For example, mixture constraint 210 of global EDD 64 can be created that includes a value of twelve for a weight limit 212 of an Item 1 listed in a mixture constraint description 214. Weight limit 212 causes solver/analyzer 42 to limit the weight of all quantities of item 1 to an average of on more than (or no less than) twelve pounds. Mixture constraint 210 allows heterogeneity in an allocation providing the average is within specified limits. Therefore, in this example, suppose it is desired to have a mixture of weights, providing the average weight is no more than (or no less than) twelve pounds. With mixture constraint 210, it does not matter how the various weights are mixed. The average value which is constrained by mixture constraint 210 may be determined by any one or a combination of items. Mixture constraints may also be price weighted, i.e., the prices of each bid will weight the average. For example, an attribute, e.g., item weight, on a $2 bid will have twice the effect of the same attribute has on a $1 bid.

In the foregoing example, a mixture constraint 210 is described as being operative on an item attribute, i.e., weight. A mixture constraint, however, can also be operative on a bid attribute of a bid group. Examples of exemplary bid attributes that a mixture constraint can operate on are described above in connection with FIG. 7.

Figure 13:
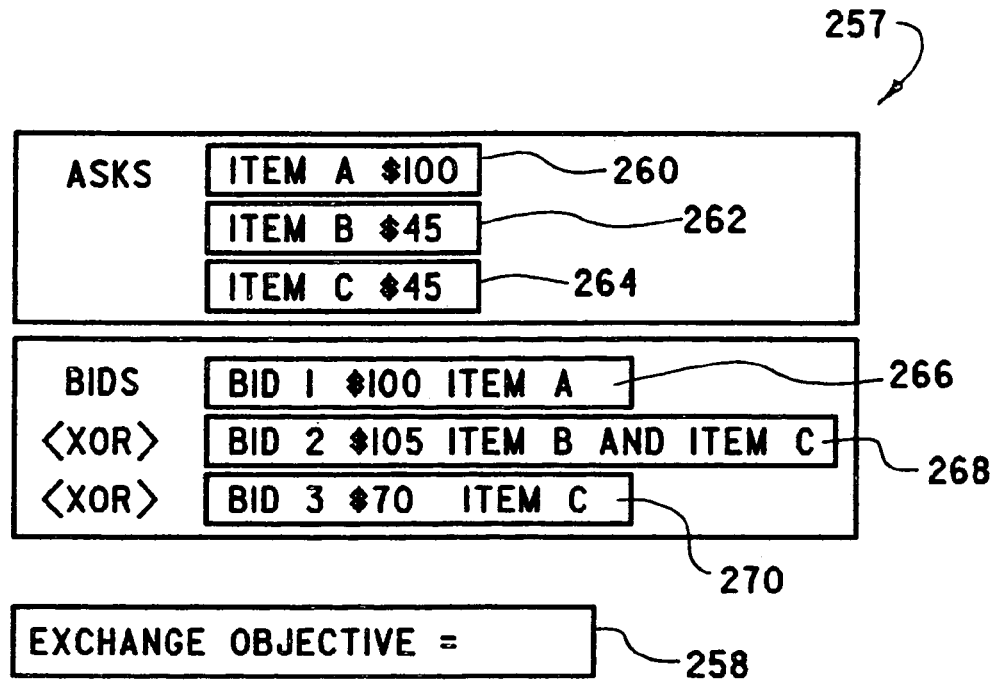
FIG. 13 is a diagrammatic illustration of a constraint relaxation feature of an EDD.

Objective(s):

With reference to FIG. 13, an objective feature 257 of global EDD 64 establishes a maximization or minimization goal that solver/analyzer 42 utilizes to determine an allocation value for an exchange. Each maximization goal has one specific meaning for forward auctions, reverse auctions, and exchanges. Each minimization goal has one specific meaning for a reverse auction.

An objective can be: surplus, traded bid volume, traded ask volume or traded average volume. Each objective expresses a maximization goal for forward auctions and exchanges or a minimization goal for reverse auctions. The following table shows the meanings for each of these objectives.

| Objective | Forward Auction | Reverse Auction | Exchange |
| --- | --- | --- | --- |
| Surplus | sum of accepted bids less the sum of their item reserved prices | N/A | sum of accepted bids less sum of accepted asks |
| Traded bid | sum of accepted bids | N/A | sum of accepted bids |
| Traded ask volume | sum of item reserve prices of accepted bids | sum of accepted asks | sum of accepted asks |
| Traded average | average of the sum of accepted bids and sum of their item reserve prices | N/A | Average of the sum of accepted bids and sum of accepted asks |

The meaning associated with each of the foregoing objectives causes solver/analyzer 42 to perform a specific optimization. An objective is useful because it enables specification of exactly what is wanted in a forward auction or exchange. For example, suppose a seller has three items for sale: item A 260, item B 262 and item C 264 for $100 dollars, $45 dollars and $45 dollars, respectively. These are ask bids since the seller is asking to sell these three items. Moreover, suppose there are three buy bids: Bid 1 266 for Item A 260 at a cost of $100; Bid 2 268 for Items B and C 262 and 264 at a cost of $105; and Bid 3 270 for Item C 264 at a cost of $70. Furthermore, suppose that these three buy bids are logically connected by an XOR (exclusive OR) logical operator whereupon only one of Bids 266, 268 and 270 will be allocated by solver/analyzer 42.

If an exchange objective 258 included in objective feature 257 associated with one or more bids or bid groups is "traded ask", Bid 266 is allocated by solver/analyzer 42 since it has the maximum ask value. In contrast, if the exchange objective is "traded bid", Bid 2 268 is selected since it has the maximum bid value. If the exchange objective is a "surplus", Bid 3 270 is allocated since the values associated with bids A and B 266 and 268 have the maximum surplus value. Lastly, if the exchange objective is "traded average", either Bid 1 for Item A 260 at $100 or Bid 2 for Items B and C 262 and 264 at $105 is selected. An objective can also be the number of winning bidders or the number of losing bidders in an allocation.

Figure 14:
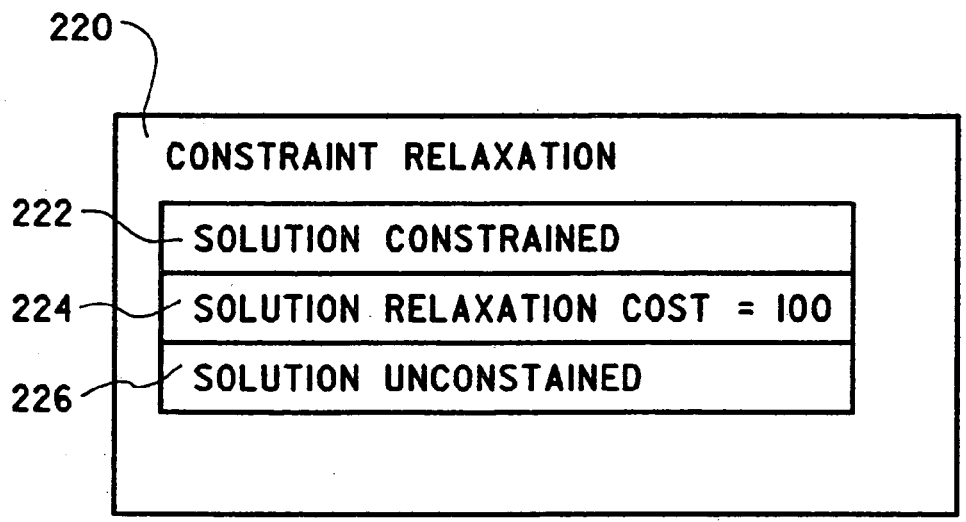
FIG. 14 is a diagrammatic illustration of allocations that occur in response to the constraint relaxation solutions shown in FIG. 13.

Constraint Relaxer(s):

With reference to FIGS. 14 and 15, all of the constraints that have been described thus far have the capacity to be relaxed. This is implemented using a constraint relaxer feature 220 of global EDD 64. The ability to relax a constraint has two purposes. Namely, to obtain candidate allocations when the original, constrained problem does not have a feasible allocation, and to search for alternative allocations when there is a feasible solution. Such alternative allocations illustrate the impact on a solution value as more important constraints are relaxed. The importance of each constraint depends on the relative constraint relaxation importance weight assigned thereto. These weights are dependent on the weights and types of each constraint in an exchange.

FIG. 14 depicts a constraint relaxation feature list 220 of global EDD 64 that includes desired solutions 222, 224 and 226 that apply to constraints specified for an exchange. For example, constrained solution 222 is a request for solver/analyzer 42 to search for an allocation with all the constraints in place, while unconstrained solution 226 is a request for solver/analyzer 42 to search for an allocation with no constraints in place. Between constrained and unconstrained solutions 222 and 226, there is relaxation solution 224. Relaxation solution 224 is a request for solver/analyzer 42 to search for one or more allocations as a function of soft and/or hard properties for each constraint. For example, in FIGS. 8(a) and 10(a) soft properties 228 and 236 are set for cost constraint 110 and counting constraint 180, respectively, while in FIG. 9(a), a hard property 232 is set for unit constraint 142. When relaxation solution 224 is selected in constraint relaxation feature list 220, these properties cause solver/analyzer 42 to obtain a feasible solution by relaxing the soft constraints in FIG. 8(a) and FIG. 10(a) while maintaining the hard constraint in FIG. 9(a). In this example, the hard constraint is so important that to relax it will create a useless allocation.

More specifically, constrained solution 222 causes solver/analyzer 42 to create constrained allocation 240, namely, a fully constrained allocation for which either a feasible, market desirable solution or an infeasible solution exists. In other words, constrained allocation 240 shows the bids that should be awarded given all of the input conditions and constraints. In the example shown in FIG. 15, constrained allocation 240 shows three winning bids with an allocation value of $1,000.

In contrast, relaxation solution 224 causes solver/analyzer 42 to relax soft constraints to obtain one or more relaxed allocations 242, with the final relaxation being an unconstrained allocation 244. Unconstrained solution 226 causes solver/analyzer 42 to disable both hard and soft constraints, so that the solution can be viewed as to the effects of the constraints. Relaxed allocation 242 and unconstrained allocation 244 can show other useful allocations that do not necessarily meet all of the constraints. For example, relaxed allocation 242 shows a total of five winning bids with an allocation value of $4,000 and unconstrained allocation 242 shows a total of six bids with an allocation value of $5,000. Unconstrained allocation 244 illustrates the effect of imposing no constraints on the allocation of bids by solver/analyzer 42.

With reference back to FIGS. 8(a), 8(b), 10(a) and 10(b), a relaxation importance can be associated with soft constraints. For example, cost constraint 110 can include relaxation importance 250 associated therewith, cost requirement 130 can include relaxation importance 252 associated therewith, counting constraint 180 can include relaxation importance 254 associated therewith and counting requirement 190 can include relaxation importance 256 associated therewith. Unit constraint 142 and unit requirement 160 can also include a relaxation importance if desired. The use of these relaxation importances will now be described.

Figure 10A:
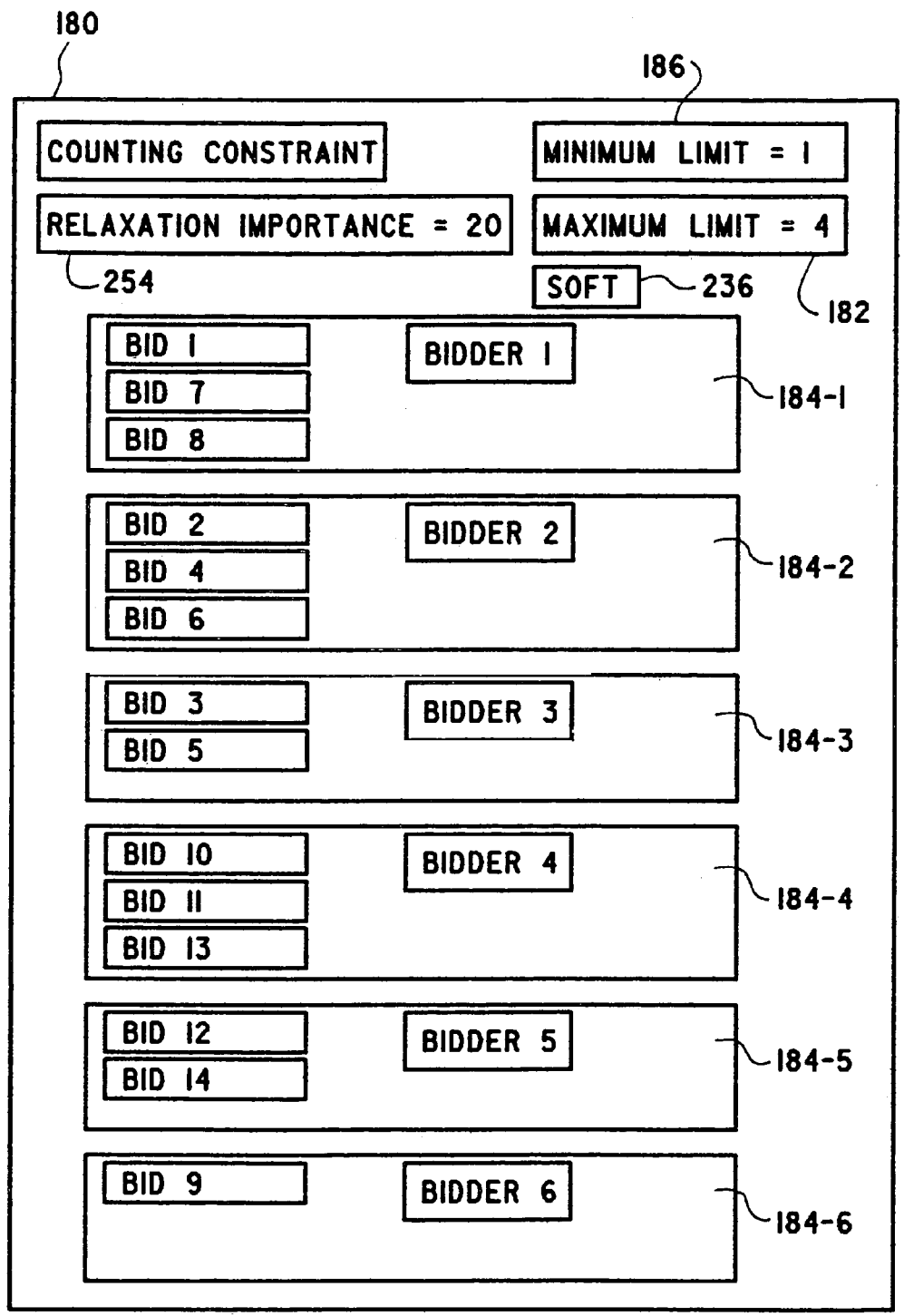
FIG. 10a is a diagrammatic illustration of a counting constraint feature of an EDD.
Figure 10B:
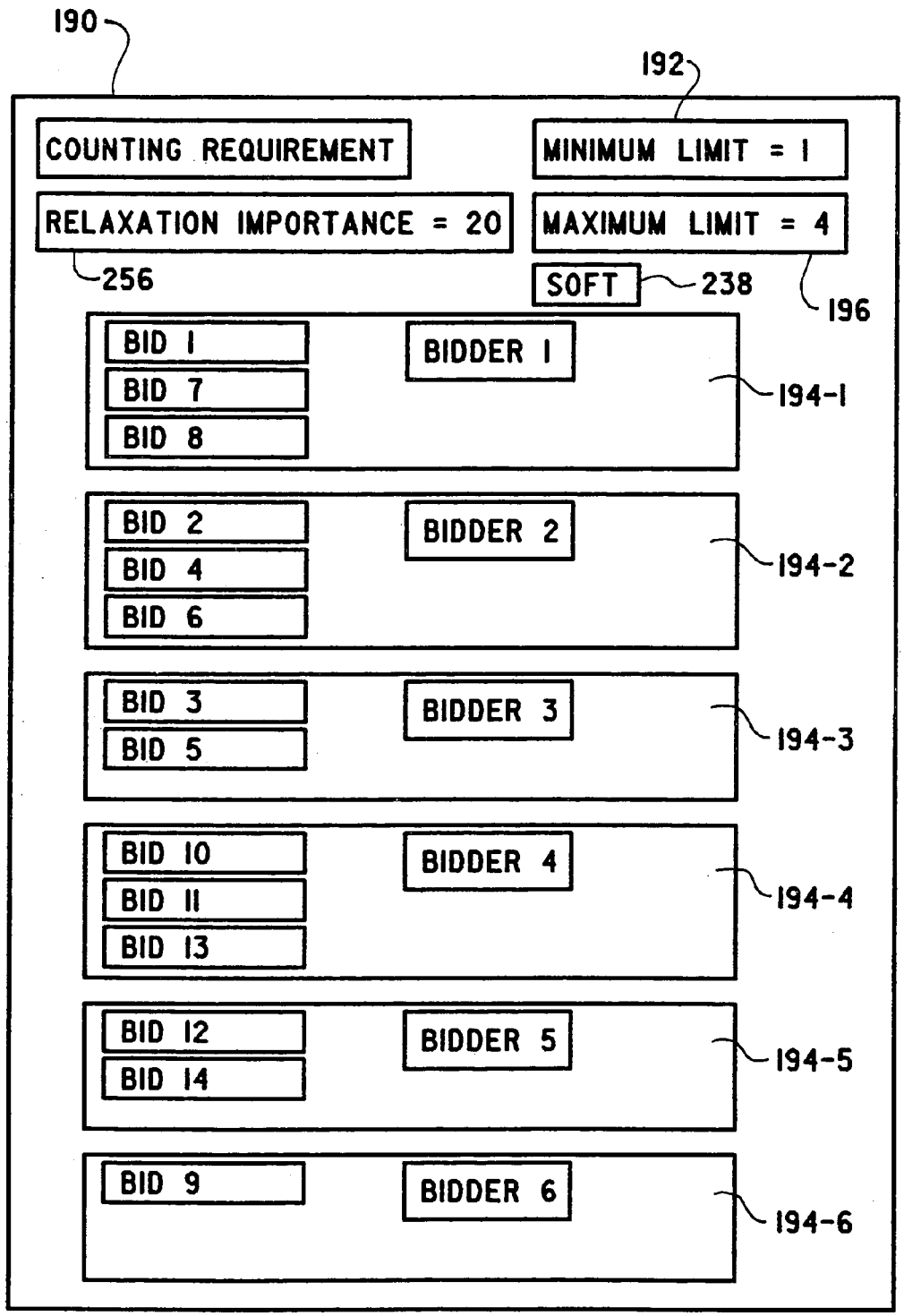

In FIG. 8(a), cost constraint 110 has a value of ten for its relaxation importance 250. In FIG. 10(a), counting constraint 180 has a value of twenty for its relaxation importance 254. Cost constraint 110 and counting constraint 180 have soft property 228 and soft property 236, respectively, which enable solver/analyzer 42 to relax cost constraint 110 and counting constraint 180. In use of relaxation importance 250 and 254, if solver/analyzer 42 determines that cost constraint 110 or counting constraint 180 can be relaxed to obtain a feasible allocation, but it is not necessary to relax both, then cost constraint 110 having a value of ten for its relaxation importance 250 would be relaxed instead of relaxing counting constraint 180 having a value of twenty for its relaxation importance 254.

When constraint relaxation feature list 220 includes relaxation solution 224, solver/analyzer 42 interprets relaxation solution 224 as a request to find feasible allocations while relaxing constraints according their relaxation importance. The higher the relaxation importance, the less likely the constraint is to be relaxed, relative to other constraints. Relaxation solution 222 can also have an associated relaxation cost, e.g., 1000, which specifies the weight of the relaxation to be supplied solver/analyzer 42. The relaxation cost is calculated by aggregating, over all relaxed constraints, the amount by which the constraint is violated multiplied by its relaxation importance. The constraint relaxer feature causes solver/analyzer 42 to maximize or minimize an objective feature, discussed above, minus this relaxation cost. For example, if constraint relaxation feature list 220 included first relaxation solution 224 having a cost of 1000 and a second relaxation solution (not shown) having a cost of 2,000, solver/analyzer 42 relaxes constraints associated with the second relaxation list more than the constraints of the first relaxation list. Thus, in this example, solver/analyzer 42 would attempt to find a solution with a higher value for the second relaxation solution than the for the first relaxation solution 224.

Feasibility Obtainer:

A feasibility obtainer feature (not shown) operates like the constraint relaxer. However, it attempts to minimize the relaxation cost, instead of minimizing or maximizing an objective feature, discussed above, minus the relaxation cost. More specifically, a feasibility obtainer causes solver/analyzer 42 to generate feasible allocations when a winning allocation based constrained solution 222 is unavailable. For example, suppose that constraint relaxation feature list 220 only includes a request for a constrained solution 222 in the EDD associated with one or more bids or bid groups. Because only a constrained solution 222 has been requested, solver/analyzer 42 will only attempt to generate a winning allocation. However, if the EDD associated with the one or more bids or bid groups includes a feasibility obtainer, when solver/analyzer 42 determines that a feasible, constrained allocation cannot be found, solver/analyzer 42 relaxes one or more constraints in an attempt to find a feasible allocation.

Figure 16:
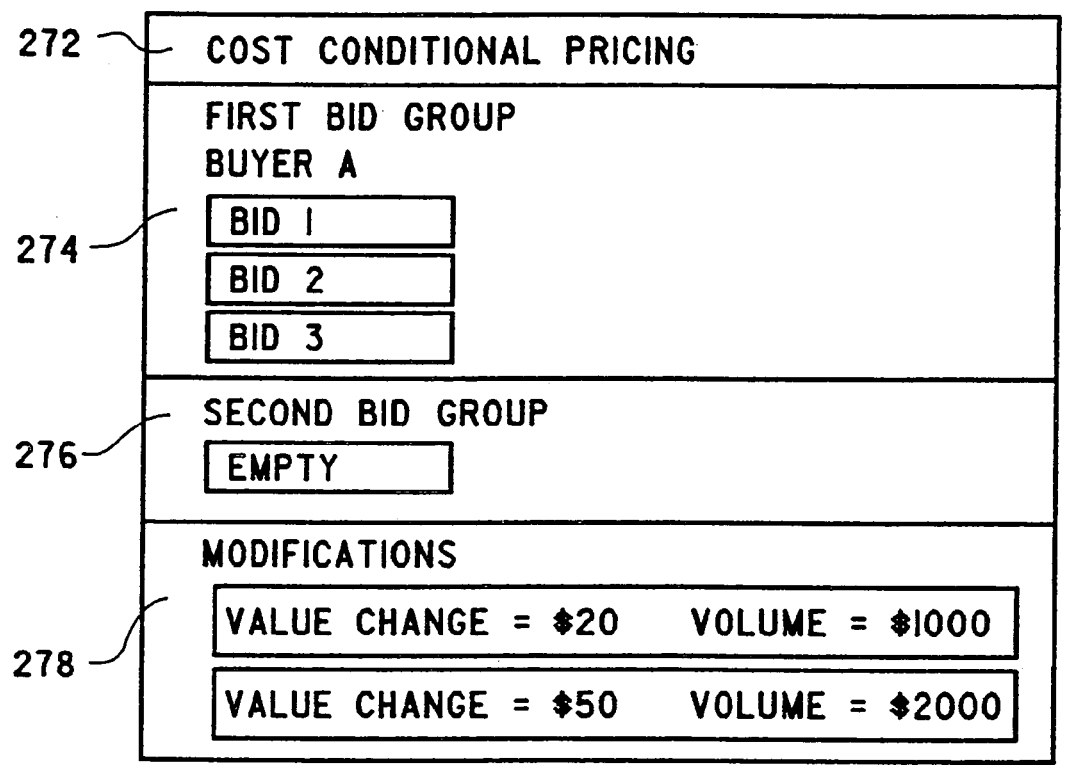
FIG. 16 is a diagrammatic illustration of a cost conditional pricing feature of a EDD.

Cost Conditional Pricing(s):

With reference to FIG. 16, a cost conditional pricing feature 272 of global EDD 64 modifies an outcome of a forward auction, a reverse auction or an exchange based on value limit(s). In an example of setting these limits, two bid groups 274 and 276 are created. Bid group 274 is a constrained group and bid group 276 is a control group. Bid group 276 is created for illustration purposes but it is assumed that it is an empty group. Cost conditional pricing is similar in form to cost constraints, except that cost conditional pricing 272 utilizes one or more modification constraints 278 to adjust the solution rather than forcing the solution to obey the constraints. Advantages of changing the price outcome of an exchange include, for example, giving a rebate of $20 if a buyer in a forward auction spends more than $1000 or a rebate of $50 if the buyer spends more than $2000. For example, bid group 274 is formed including all of the bids associated with buyer A. Cost conditional pricing 272 uses the difference in the volume of bid groups 274 and 276. In this example, since bid group 276 includes no bids, its volume defaults to empty and the difference is the volume of the bids of bid group 274 for buyer A. Modification constraint 278 causes solver/analyzer 42 to discount the bid of bid group 274 by $20 if the value of first bid group 274 is $1,000 or above. Moreover, modification constraint 278 causes solver/analyzer 42 to discount bid group 274 by $50 if the bid price of bid group 274 is $2,000 or above.

Figure 17:
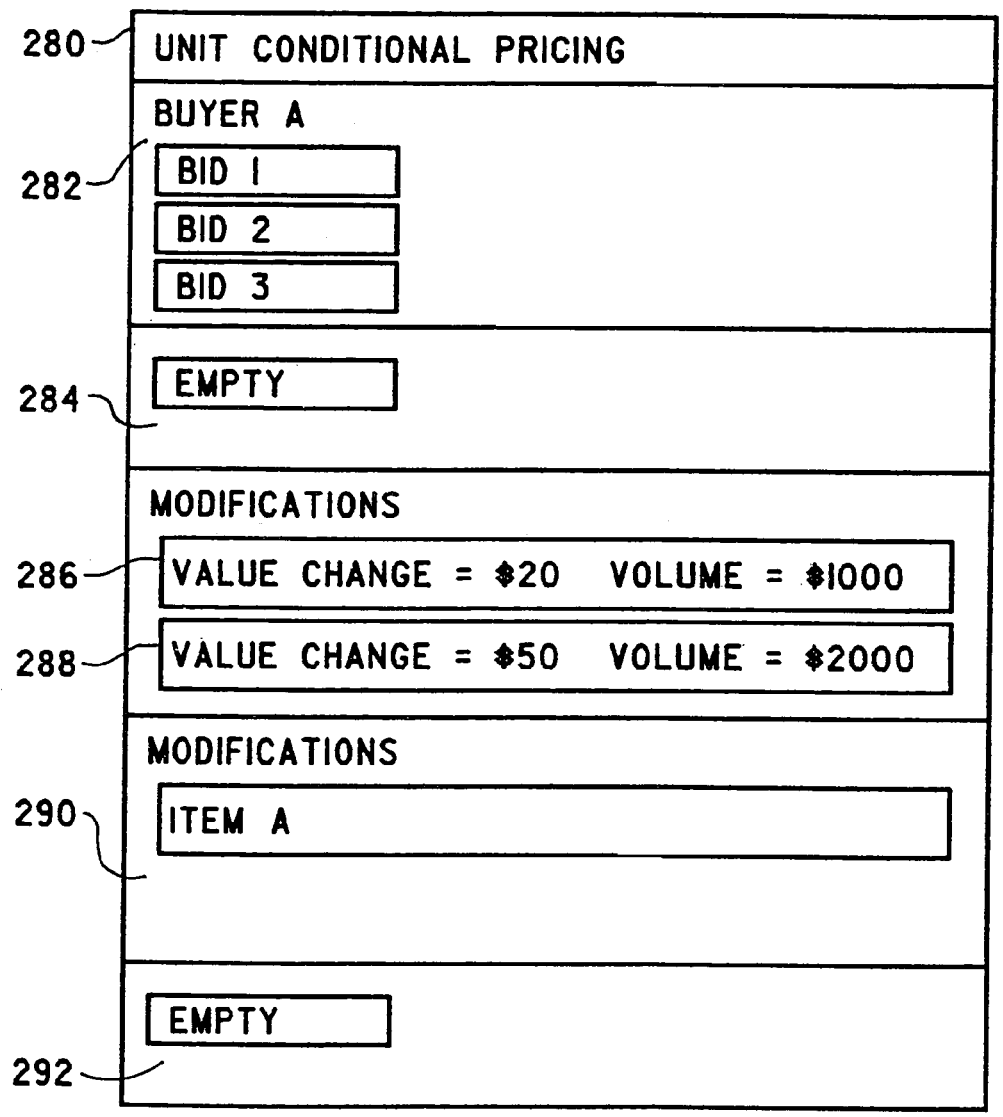
FIG. 17 is a diagrammatic illustration of a unit conditional pricing feature of an EDD.

Unit Conditional Pricing(s):

With reference to FIG. 17, a unit conditional pricing feature 280 of global EDD 64 modifies the price outcome of a forward auction, a reverse auction or an exchange based on a difference in volume of units of two or more bids or bid groups of two or more bidders. In an example of setting the limit of unit conditional pricing 280, two bid groups 282 and 284 are created. Bid group 280 is the constrained group and bid group 284 is the control group. In this example, Bid group 284 is created for illustration purposes, but it is assumed that it is an empty group. Unit conditional pricing is similar in form to a unit constraint, except that unit conditional pricing 280 adjusts the solution rather than forcing the solution to obey the constraints. For example, suppose bid group 282 is formed including all of the bids associated with buyer A and condition modifiers 286 and 288 are formed. Solver/analyzer 42 then determines a difference in unit volume between items of an item group A 290 traded by bid group 280 and items of an item group 292 traded by bid group 284. If this difference is greater than the volume included in condition modifier 286, a discount of $20 is given to the bid group 282 or 284 having the greater volume. Similarly, if the difference in unit volume is greater than the value of the volume included in condition modifier 282, a discount of $50 included in condition modifier 288 is given to the bid group 282 or 284 having the greater volume. In the example shown in FIG. 17, since item group 292 and bid group 294 are empty, the volume is the number of units of item A listed in item group A 290 traded by bid group 282. Unit conditional pricing 280 uses the difference in the volume of the bid groups 282 and 284. In this example, since bid group 284 includes no bids, its volume defaults to empty and the difference is the volume of bid group 282 for buyer A. If the volume of bid group 282 is 1000 units or more than the volume of bid group 284, solver/analyzer 42 determines that condition modifier 286 is applicable and a discount of $20.00 is given. Similarly, if the volume of bid group 282 is 2000 units or more than the volume of bid group 284, solver/analyzer 42 determines that condition modifier 288 is applicable and a discount of $50.00 is given.

Quote Request:

A quote request feature (not shown) can be utilized to cause solver/analyzer 42 to treat a bid as a "quote request", whereupon solver/analyzer returns a price where the bid would just be included in an allocation, i.e., the least competitive price. In use, a quote request is enabled in an EDD associated with a bid. In response to receiving this bid and the associated EDD, solver/analyzer 42 determines a price where the bid would just be included in an allocation and outputs this price in association with the bid for consideration by the entity initiating the quote request, e.g., buyer, seller or exchange manager. Thereafter, if the entity initiating the quote request wishes to place one or more bids or associate one or more bids with a bid group that solver/analyzer 42 considers for inclusion into an allocation, such bid is made or such bid group is formed separately from the quote request. As can be seen, solver/analyzer 42 treats a quote request like a bid.

As can be seen, the features of EDDs 60, 62 and 64 enable a buyer, a seller or an exchange manager to modify the processing of one or more bids or bid groups by solver/analyzer 42 to generate different, feasible allocations that may be desirable in the winner determination process. This may be performed iteratively in order to see the effects of these modifications on the winning allocations.

Solver/analyzer 42 can include suitable software controls for terminating the processing of bids related to determination of an allocation. One control is a maximum processing time whereupon, when the maximum processing time is reached, solver/analyzer 42 terminates processing and reports the best allocation found. Another control compares the best allocation found at any point in time with an optimal allocation, i.e., an allocation with all integer constraints relaxed. If the difference between those two allocations reaches a predetermined value, solver/analyzer 42 terminates processing and reports the best allocation found. Another control is a manual abort command that can be issued by, for example, the exchange manager. In response to receiving this manual abort command, solver/analyzer 42 terminates processing and reports the best allocation found.

The invention has been described with reference to the preferred embodiments. Obvious modifications and alterations will occur to others upon reading and understanding the preceding detailed description. For example, the foregoing examples are for the purpose of illustration and are not to be construed in any way as limiting the invention. Moreover, while the currency values in some of the foregoing examples are expressed in United States dollars, the use of the present invention with other currencies is envisioned. It is intended that the invention be construed as including all such modifications and alterations insofar as they come within the scope of the appended claims or the equivalents thereof.

The invention is claimed to be:

1. A computer-implemented method of conducting a combinatorial exchange comprising:
   (a) electronically storing in a computer storage a plurality of bids of a combinatorial exchange, wherein each bid includes at least one item and an associated bid price;
   (b) electronically associating exchange description data (EDD) stored in the computer storage with at least one of the following: a subset of the received bids, each bid of the subset of the received bids, and/or the combinatorial exchange itself, wherein the EDD stored in the computer storage comprises a representation of at least one of the following features: a non-price attribute of a bid; a non-price attribute of an item; an item adjustment; a bid adjustment; a cost constraint; a unit constraint; a cost requirement; a unit requirement; a counting constraint; a counting requirement; a homogeneity constraint; a mixture constraint; cost conditional pricing; or unit conditional pricing;
   (c) a model builder electronically constructing a model of (1) the bids received in step (a) and (2) the EDD electronically associated in step (b) with at least one of the following: the subset of the received bids, each bid of the subset of the received bids, and/or the combinatorial exchange itself;
   (d) a solver/analyzer electronically processing the model constructed in step (c) to determine for the combinatorial exchange an infeasible allocation, a winning allocation or a feasible allocation of received bids and a value for said allocation; and
   (e) electronically outputting the allocation and the value determined in step (d).

2. The method as set forth in claim 1, wherein:
   the non-price attribute of a bid is one of credit history, shipping cost, bidder credit worthiness, bidder business location, bidder business size, bidder zip code, bidder reliability, bidder reputation, bidder timeliness, freight terms and conditions, insurance terms and conditions, bidder distance and bidder flexibility; and the non-price attribute of an item is one of size, color, weight, delivery date, width, height, purity, concentration, pH, brand, hue, intensity, saturation, shade, reflectance, origin, destination, volume, earliest pickup time, latest pickup time, earliest dropoff time, latest dropoff time, production facility, packaging and flexibility.

3. The method as set forth in claim 1, wherein:

the item adjustment includes a condition and a value that is utilized to modify the bid price of the associated bid when the condition is satisfied, wherein the item adjustment is based on an item attribute of at least one item of the associated bid; and the bid adjustment includes a condition and a value that is utilized to modify the bid price of the associated bid when the condition is satisfied, wherein the bid adjustment is based on a bid attribute of the at least one bid.

4. The method as set forth in claim 3, wherein:

the item attribute is one of the following: size, color, weight, delivery date, width, height, purity, concentration, pH, brand, hue, intensity, saturation, shade, reflectance, origin, destination, volume, earliest pickup time, latest pickup time, earliest dropoff time, latest dropoff time, production facility, packaging and flexibility; and the bid attribute is one of the following: a size of one or more items of the bid, a color of one or more items of the bid, a weight of one or more items of the bid, delivery date, bidder credit history, shipping costs, bidder credit worthiness, freight terms and conditions, insurance terms and conditions, bidder distance and bidder flexibility.

5. The method as set forth in claim 1, wherein, in addition to the at least one feature of step (b), the EDD stored in the computer storage further comprises a representation of at least one of the following objectives: a surplus, a traded ask volume, a traded bid volume, a traded average volume, a number of winning bidders, or a number of losing bidders.

6. The method as set forth in claim 1, wherein:

the cost constraint causes an amount of an exchange value that is allocated to a bid group to be limited to no more than a predetermined percent or cost of the exchange value, where the bid group includes at least one bid;

the unit constraint causes a quantity of an item that is awarded to a bid group to be limited to no more than a predetermined maximum quantity or percentage, where the bid group includes at least one bid;

the cost requirement causes a bid group to be allocated at least a predetermined percent or cost of an allocation value, or nothing, where the bid group includes at least one bid;

the unit requirement causes a bid group to be allocated at least a predetermined quantity or percentage of an allocation, or nothing, where the bid group includes at least one bid;

the counting constraint causes an allocation to be generated that includes a number of winning bid groups within a specified range, where each bid group includes at least one bid;

the counting requirement causes an allocation to be generated that includes at least one of the following: no winning bid groups or a number of winning bid groups within a specified range, where each bid group includes at least one bid;

the homogeneity constraint causes an allocation to be generated that includes a uniformity of items or bids as a function of an item attribute description associated with the items or bids; and the mixture constraint causes an allocation to be generated that includes a specified average limit of an item or bid attribute of a bid group.

7. The method as set forth in claim 1, wherein, in addition to the at least one feature of step (b), the EDD stored in the computer storage further comprises a representation of a constraint relaxer that causes at least one soft constraint placed on an exchange to be relaxed.

8. The method as set forth in claim 7, wherein the exchange includes at least one hard constraint that the solver/analyzer cannot relax.

9. The method as set forth in claim 7, wherein a value is associated with the relaxation of the at least one relaxed soft constraint.

10. The method as set forth in claim 9, wherein the value is aggregated across at least two relaxed soft constraints.

11. The method as set forth in claim 10, wherein the aggregate constraint relaxation value is a function of how much each soft constraint is relaxed.

12. The method as set forth in claim 11, wherein:

each soft constraint is assigned a weight;

the aggregate constraint relaxation value is a sum of the relaxation values of the relaxed soft constraints; and the relaxation value of each relaxed soft constraint is one of the following: (i) a weight associated with the constraint, (ii) the weight of the constraint multiplied by a percentage amount that said constraint is relaxed, or (iii) the weight of the constraint multiplied by the absolute amount that said constraint is relaxed.

13. The method as set forth in claim 10, wherein the allocation (i) satisfies each hard constraint of the exchange that the solver/analyzer cannot relax and (ii) maximizes or minimizes a value of the exchange minus or plus, respectively, the aggregate constraint relaxation value.

14. The method as set forth in claim 10, wherein, in addition to the at least one feature of step (b), the EDD stored in the computer storage further comprises a representation of a feasibility obtainer that causes an allocation to be output that (i) satisfies each hard constraint of the exchange that the solver/analyzer cannot relax and (ii) minimizes the aggregate constraint relaxation value.

15. The method as set forth in claim 1, wherein:

the cost conditional pricing causes a value of an allocation to be modified based on a difference between (i) a total currency volume awarded to a first bid group, or a total currency volume awarded to a subset of the items of the first bid group and (ii) a total currency volume awarded to a second bid group, or a total currency volume awarded to a subset of the items of the second bid group, wherein the first bid group includes at least one bid; and the unit conditional pricing causes a value of an allocation to be modified based on a difference between (i) a unit volume awarded to a first bid group, or a unit volume awarded to a subset of the items of the first bid group and (ii) a unit volume awarded to a second bid group, or a unit volume awarded to a subset of the items of the second bid group, wherein the first bid group includes at least one bid.

16. The method as set forth in claim 1, wherein, in addition to the at least one feature of step (b), the EDD stored in the computer storage further comprises a representation, for each item, of whether there is free disposal of the item, wherein free disposal of the item enables the solver/analyzer to either (i) allocate less than an offered quantity of the item for sale without affecting the price of the bid that includes the item or (ii) allocate more than an offered quantity of the item for purchase without affecting the price of the bid that includes the item.

17. The method as set forth in claim 1, further comprising at least one of the steps of:
(i) modifying at least one feature of the EDD associated with the at least one bid and processing the at least one bid in accordance with said modified feature;
(ii) including another feature with the EDD associated with the at least one bid and processing the at least one bid in accordance with said other feature; and
(iii) associating with the bid another EDD that includes another feature and processing the at least one bid in accordance with said other feature.

18. The method as set forth in claim 1, further comprising terminating processing of the model in step (d) in response to at least one of the following: (i) elapse of predetermined time interval, (ii) a current best solution being within a predetermined numerical distance of an optimal solution, or (iii) a manual abort command.

19. The method as set forth in claim 1, wherein, in addition to the at least one feature of step (b), the EDD stored in the computer storage further comprises a representation of a quote request that causes, for a bid associated with the quote request, a price to be determined that would result in the bid being included in an allocation.

20. The method of claim 1, wherein the representation of step (b) is a computer language.

21. The method of claim 20, wherein the computer language is XML.

22. The method as set forth in claim 1, wherein, in addition to the at least one feature of step (b), the EDD stored in the computer storage further comprises a representation, for each item, of the free disposal quantity of the item, wherein free disposal of the item enables the solver/analyzer to either (i) allocate as little as an offered quantity of the item for sale, minus the free disposal quantity, without affecting the price of the bid that includes the item or (ii) allocate as much as an offered quantity of the item for purchase, plus the free disposal quantity, without affecting the price of the bid that includes the item.

23. A computer readable medium having stored thereon instructions which, when executed by a processor, cause the processor to perform the steps of:
(a) electronically store a plurality of bids of a combinatorial exchange in a computer storage, with each bid including at least one item and an associated bid price;
(b) cause exchange description data (EDD) stored in the computer storage to be electronically associated with at least one of the following: a subset of the received bids, each bid of the subset of the received bids, and/or the combinatorial exchange itself, wherein the EDD stored in the computer storage comprises a representation of at least one of the following features: a non-price attribute of a bid; a non-price attribute of an item; an item adjustment; a bid adjustment; a cost constraint; a unit constraint; a cost requirement; a unit requirement; a counting constraint; a counting requirement; a homogeneity constraint; a mixture constraint; cost conditional pricing; or unit conditional pricing;
(c) cause a model builder to electronically build a model of the received plurality of bids and the EDD associated with each bid of the subset of the plurality of bids;
(d) cause a solver/analyzer to electronically process said model to determine an infeasible allocation, a winning allocation or a feasible allocation and an allocation value for said exchange; and
(e) electronically output the allocation determined in step (d).

24. A computer-implemented method of conducting a combinatorial exchange comprising:
(a) electronically storing in a computer storage a plurality of bids of a combinatorial exchange, wherein each bid includes at least one item and an associated bid price;
(b) electronically associating exchange description data (EDD) stored in the computer storage with at least one of the following: a subset of the received bids, each bid of the subset of the received bids, and/or the combinatorial exchange itself, wherein the EDD stored in the computer storage comprises a representation of at least one of the following features:
a non-price attribute of an item,
an item adjustment,
a cost requirement,
a unit requirement,
a counting requirement,
a mixture constraint,
a homogeneity constraint,
cost conditional pricing, or
unit conditional pricing;
(c) a model builder electronically constructing a model of (1) the bids received in step (a) and (2) the EDD electronically associated in step (b) with: the subset of the received bids, each bid of the subset of the received bids, and/or the combinatorial exchange itself;
(d) a solver/analyzer electronically processing the model constructed in step (c) to determine for the combinatorial exchange an infeasible allocation, a winning allocation or a feasible allocation of received bids and a value for said allocation, subject to the EDD electronically associated in step (b); and
(e) electronically outputting the allocation and the value determined in step (d).

25. The method of claim 24, wherein the non-price attribute of an item includes one of the following: size, color, weight, delivery date, width, height, purity, concentration, pH, brand, hue, intensity, saturation, shade, reflectance, origin, destination, volume, earliest pickup time, latest pickup time, earliest dropoff time, latest dropoff time, production facility, packaging, and flexibility.

26. The method of claim 24, wherein:
the item adjustment includes a condition and a value that is utilized to modify the bid price of an associated bid when the condition is satisfied; and
the condition is based on a non-price attribute on an item of the associated bid.

27. The method of claim 24, wherein the cost requirement causes a bid group that includes at least one bid to be allocated either a predetermined percent of an allocation value, a predetermined cost of the allocation value, or nothing.

28. The method of claim 24, wherein the unit requirement causes a bid group that includes at least one bid to be allocated either a predetermined quantity of an allocation, a predetermined percentage of an allocation, or nothing.

29. The method of claim 24, wherein the counting requirement causes an allocation to be generated that includes either no winning bid groups or a number of winning bid groups within a specified range, wherein each bid group includes at least one bid.

30. The method of claim 24, wherein the mixture constraint causes an allocation to be generated that includes a specified average limit of either an item attribute of a bid group or a bid attribute of a bid group.

31. The method of claim 24, wherein the homogeneity constraint causes an allocation to be generated that includes a uniformity of items or bids based on a non-price attribute of the items or bids, respectively.

32. The method of claim 24, wherein the cost conditional pricing causes a value of an allocation to be modified based on a difference between the total awarded currency volume of a first bid group and the total awarded currency volume of a second bid group, where the first bid group includes at least one bid.

33. The method of claim 24, wherein the unit conditional pricing causes a value of an allocation to be modified based on a difference between an awarded unit volume of a first bid group and an awarded unit volume of a second bid group, where the first bid group includes at least one bid.

34. The method of claim 24, wherein, in addition to the at least one feature of step (b), the EDD stored in the computer storage further comprises a representation, for each item, of whether there is free disposal of the item, wherein free disposal of the item enables the solver/analyzer to either (i) allocate less than an offered quantity of the item for sale without affecting the price of the bid that includes the item or (ii) allocate more than an offered quantity of the item for purchase without affecting the price of the bid that includes the item.

35. The method of claim 24, wherein, in addition to including at least one of the features in step (b), the EDD stored in the computer storage further comprises a representation of at least one of the following non-price attributes on a bid: credit history, shipping cost, bidder credit worthiness, bidder business location, bidder business size, bidder zip code, bidder reliability, bidder reputation, bidder timeliness, freight terms and conditions, insurance terms and conditions, bidder distance and bidder flexibility.

36. The method of claim 24, wherein, in addition to including at least one of the features in step (b), the EDD stored in the computer storage further comprises a representation of a bid adjustment that includes a condition and a value that is utilized to modify the bid price of the associated bid when the condition is satisfied.

37. The method of claim 24, wherein, in addition to including at least one of the features in step (b), the EDD stored in the computer storage further comprises a representation of at least one of the following constraints:
a cost constraint that causes an amount of an exchange value that is allocated to a bid group to be limited to no more than a predetermined percent or cost of the exchange value, where the bid group includes at least one bid;
a unit constraint that causes a quantity of an item that is awarded to a bid group to be limited to no more than a predetermined maximum quantity or percentage, where the bid group includes at least one bid; or
a counting constraint that causes an allocation to be generated that includes a number of winning bid groups within a specified range, where each bid group includes at least one bid.

38. The method of claim 24, wherein, in addition to including at least one of the features in step (b), the EDD stored in the computer storage further comprises a representation of at least one of the following:
a feasibility obtainer that causes an allocation to be output that (i) satisfies each hard constraint of the exchange that the solver/analyzer cannot relax and (ii) minimizes a value associated with said relaxation;
a constraint relaxer that causes at least one constraint placed on an exchange to be relaxed and to determine a value associated with said relaxation, or
a quote request that causes, for a bid associated with the quote request, a price to be determined that would result in the bid being included in an allocation.

39. The method of claim 24, wherein, in addition to including at least one of the features in step (b), the EDD stored in the computer storage further comprises a representation of at least one of the following objectives: a surplus, a traded ask volume, a traded bid volume, a traded average volume, a number of winning bidders, or a number of losing bidders.

40. The method of claim 24, further comprising at least one of the steps of:
(i) modifying at least one feature of the EDD associated with the at least one bid and processing the at least one bid in accordance with said modified feature;
(ii) including another feature with the EDD associated with the at least one bid and processing the at least one bid in accordance with said other feature; and
(iii) associating with the bid another EDD that includes another feature and processing the at least one bid in accordance with said other feature.

41. The method of claim 24, further comprising terminating processing of the model in step (d) in response to at least one of the following: (i) elapse of predetermined time interval, (ii) a current best solution being within a predetermined numerical distance of an optimal solution, or (iii) a manual abort command.

42. The method of claim 24, wherein the representation of step (b) is a computer language.

43. A computer-implemented method of conducting a combinatorial exchange comprising:
(a) electronically storing in a computer storage a plurality of bids of a combinatorial exchange, wherein each bid includes at least one item and an associated bid price;
(b) electronically associating exchange description data (EDD) stored in the computer storage with at least one of the following: a subset of the received bids, each bid of the subset of the received bids, and/or the combinatorial exchange itself, wherein the EDD stored in the computer storage comprises a representation of at least one of the following features:
an item adjustment,
a cost requirement,
a unit requirement,
a counting requirement,
cost conditional pricing, or
unit conditional pricing;
(c) a model builder electronically constructing a model of (1) the bids received in step (a) and (2) the EDD electronically associated in step (b) with: the subset of the received bids, each bid of the subset of the received bids, and/or the combinatorial exchange itself;
(d) a solver/analyzer electronically processing the model constructed in step (c) to determine for the combinatorial exchange an infeasible allocation, a winning allocation or a feasible allocation of received bids and a value for said allocation, subject to the EDD electronically associated in step (b); and
(e) electronically outputting the allocation and the value determined in step (d).

44. The method of claim 43, wherein:

the item adjustment includes a condition and a value that is utilized to modify the bid price of an associated bid when the condition is satisfied; and the condition is based on a non-price attribute on an item of the associated bid.

45. The method of claim 43, wherein:

the cost requirement causes a bid group that includes at least one bid to be allocated either a predetermined percent of an allocation value, a predetermined cost of the allocation value, or nothing;

the unit requirement causes a bid group that includes at least one bid to be allocated either a predetermined quantity of an allocation, a predetermined percentage of an allocation, or nothing; and the counting requirement causes an allocation to be generated that includes either no winning bid groups or a number of winning bid groups within a specified range, wherein each bid group includes at least one bid.

46. The method of claim 43, wherein:

the cost conditional pricing causes a value of an allocation to be modified based on a difference between (i) a total currency volume awarded to a first bid group, or a total currency volume awarded to a subset of the items of the first bid group and (ii) a total currency volume awarded to a second bid group, or a total currency volume awarded to a subset of the items of the second bid group, wherein the first bid group includes at least one bid; and the unit conditional pricing causes a value of an allocation to be modified based on a difference between (i) a unit volume awarded to a first bid group, or a unit volume awarded to a subset of the items of the first bid group and (ii) a unit volume awarded to a second bid group, or a unit volume awarded to a subset of the items of the second bid group, wherein the first bid group includes at least one bid.

47. The method of claim 43, wherein, in addition to including at least one of the features in step (b), the EDD stored in the computer storage further comprises a representation of at least one of the following features: free disposal, a non-price attribute on a bid, a non-price attribute on an item, a bid adjustment, an objective, a cost constraint, a unit constraint, a counting constraint, a homogeneity constraint, a mixture constraint, a feasibility obtainer, a constraint relaxer, and a quote request.

48. The method of claim 43, wherein the representation of step (b) is a computer language.

49. A computer-implemented method of conducting a combinatorial exchange comprising:

(a) electronically storing in a computer storage a plurality of bids of a combinatorial exchange, wherein each bid includes at least one item and an associated bid price;

(b) electronically associating exchange description data (EDD) stored in the computer storage with at least one of the following: a subset of the received bids, each bid of the subset of the received bids, and/or the combinatorial exchange itself, wherein the EDD stored in the computer storage comprises a representation of at least one of the following features:

an item adjustment, a cost requirement, a counting requirement, or cost conditional pricing;

(c) a model builder electronically constructing a model of (1) the bids received in step (a) and (2) the EDD electronically associated in step (b) with: the subset of the received bids, each bid of the subset of the received bids, and/or the combinatorial exchange itself;

(d) a solver/analyzer electronically processing the model constructed in step (c) to determine for the combinatorial exchange an infeasible allocation, a winning allocation or a feasible allocation of received bids and a value for said allocation, subject to the EDD electronically associated in step (b); and (e) electronically outputting the allocation and the value determined in step (d).

50. The method of claim 49, wherein:

the item adjustment includes a condition and a value that is utilized to modify the bid price of an associated bid when the condition is satisfied; and the condition is based on a non-price attribute on an item of the associated bid.

51. The method of claim 49, wherein:

the cost requirement causes a bid group that includes at least one bid to be allocated either a predetermined percent of an allocation value, a predetermined cost of the allocation value, or nothing; and the counting requirement causes an allocation to be generated that includes either no winning bid groups or a number of winning bid groups within a specified range, wherein each bid group includes at least one bid.

52. The method of claim 49, wherein the cost conditional pricing causes a value of an allocation to be modified based on a difference between the total awarded currency volume of a first bid group and the total awarded currency volume of a second bid group, where the first bid group includes at least one bid.

53. The method of claim 49, wherein, in addition to including at least one of the features in step (b), the EDD stored in the computer storage further comprises a representation of at least one of the following features: free disposal, a non-price attribute on a bid, a non-price attribute on an item, a bid adjustment, an objective, a cost constraint, a unit constraint, a counting constraint, a homogeneity constraint, unit conditional pricing, a mixture constraint, a feasibility obtainer, a constraint relaxer, and a quote request.

54. The method of claim 49, wherein the representation of step (b) is a computer language.

\* \* \* \* \*

UNITED STATES PATENT AND TRADEMARK OFFICE
CERTIFICATE OF CORRECTION

PATENT NO. : 7,610,236 B2  Page 1 of 1
APPLICATION NO. : 10/254241
DATED : October 27, 2009
INVENTOR(S) : Sandholm et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1864 days.

Signed and Sealed this

Twelfth Day of October, 2010

David J. Kappos
*Director of the United States Patent and Trademark Office*